United States Patent [19]

Ueta et al.

[11] Patent Number: 5,768,072
[45] Date of Patent: Jun. 16, 1998

[54] MAGNETIC HEAD FOR MAGNETIC RECORDING AND REPRODUCTION

[75] Inventors: Yutaka Ueta, Yao; Hiroyuki Ohno, Osaka; Takao Yamano; Kiyotaka Itou, both of Daito; Kousou Ishihara, Nabari; Kazuhiro Koga, Osaka; Yoshifumi Fukumoto, Sakai; Atsushi Furuzawa, Habikino; Takahiro Ogawa, Sakai; Hiroyuki Okuda, Kadoma; Toshinori Urano, Ikoma, all of Japan

[73] Assignee: Sanyo Electric Co., Ltd., Osaka, Japan

[21] Appl. No.: 663,841

[22] Filed: Jun. 14, 1996

[30] Foreign Application Priority Data

| | | | |
|---|---|---|---|
| Jun. 16, 1995 | [JP] | Japan | 7-150284 |
| Jan. 12, 1996 | [JP] | Japan | 8-004137 |
| Feb. 29, 1996 | [JP] | Japan | 8-043389 |
| Mar. 29, 1996 | [JP] | Japan | 8-077377 |

[51] Int. Cl.$^6$ ............................................. G11B 5/31
[52] U.S. Cl. ......................................................... 360/126
[58] Field of Search .................................... 360/126, 119

[56] References Cited

U.S. PATENT DOCUMENTS

| | | | |
|---|---|---|---|
| 4,888,658 | 12/1989 | Ono et al. | 360/119 |
| 4,890,378 | 1/1990 | Suzuki et al. | 360/119 |
| 5,173,825 | 12/1992 | Suzuki et al. | 360/119 |

FOREIGN PATENT DOCUMENTS 6-259718  9/1994  Japan.

*Primary Examiner*—Robert S. Tupper
*Attorney, Agent, or Firm*—Nikaido, Marmelstein, Murray & Oram LLP

[57] ABSTRACT

A magnetic head comprises a first abutting segment formed with a winding groove having an open side, and a second abutting segment opposed to the open side of the groove and joined to the first segment. The first abutting segment comprises a first core segment having the groove, and gap spacers and second ferromagnetic thin films formed on the surface thereof opposed to the second segment and positioned above and below the groove. The first core segment comprises a core segment member made of a ferromagnetic material, formed with the groove and having a first ferromagnetic thin film which is formed on the surface thereof opposed to the second abutting segment and which is positioned toward the face of the head to be opposed to recording media. The second abutting segment has a face to be opposed to the recording medium and formed by a nonmagnetic material.

6 Claims, 26 Drawing Sheets

1

MAGNETIC HEAD FOR MAGNETIC RECORDING AND REPRODUCTION

FIELD OF THE INVENTION

The present invention relates to magnetic heads for use in hard disk drives and like magnetic recording-reproduction devices, and to a process for producing the magnetic head.

BACKGROUND OF THE INVENTION

Higher recording densities are required of hard disk drives as external memory devices of computers, etc. The magnetic head for use in these devices is also required to have electromagnetic conversion characteristics adapted for recording media of high magnetic coercivity, low inductance characteristics adapted for recording and reproduction signals of high frequency, and gap length accuracy suitable for recording and reproduction signals of short wavelength.

In conformity with this trend, a magnetic head of the so-called MIG (Metal In Gap) type has been proposed which comprises a pair of opposed core segments with a narrow gap formed therebetween, and a ferromagnetic metal thin film formed on each of the gap-defining opposed faces of the core segments (see U.S. Pat. No. 5,016,341). FIG. 49 shows a magnetic head already disclosed by the present applicant as an improvement over the MIG-type magnetic head (see JP-A-259718/1994).

The disclosed head comprises a pair of first and second core segments 13, 52 made of a magnetic material such as Mn-Zn ferrite and abutting on each other with a gap spacer 4 of $SiO_2$ or like nonmagnetic material provided therebetween, and has an upper surface to be opposed to a hard disk serving as a recording medium. The second core segment 52 is provided on its lateral sides with respective layers 54, 54 of reinforcing glass. Recesses 55, 55 are formed in the upper surface to be opposed to the hard disk to determine a gap width W, which is approximately equal to the width of the track on the hard disk.

FIG. 50 is a view in section taken along the line Q—Q in FIG. 49. The first core segment 13 is formed with a winding groove 15 having an open front side. Above the winding groove 15, the front side of the first core segment 13 has a ground face 19 inclined obliquely inward. Formed on the ground face 19 is a first ferromagnetic thin film 11 having a vertical face 11a extending to the upper surface of the first core segment 13, and a slanting face 11b continuously extending from the lower end of the vertical face 11a in parallel to the ground face 19.

The second core segment 52 has a second ferromagnetic thin film 12 formed on the surface thereof opposed to the first ferromagnetic thin film 11. The two core segments 13, 52 are joined by a first glass 16 with the gap spacer 4 interposed between the thin films. The first and second thin films 11, 12 are each made of an FeAlSi alloy. While the hard disk is in use for recording or reproduction, magnetic flux passes through the second thin film 12, core segments 13, 52 and the first thin film 11 in circulation.

With reference to FIG. 50, the thickness t of the gap spacer 4 will be referred to as a gap length, and the depth d from the upper surface of the first core segment 13 to the upper end of slanting face 11b of the first thin film 11 as a gap depth. The gap spacer 4 and the magnetic films sandwiching the spacer 4 therebetween will be referred to collectively as a gap portion.

The gap spacer 4 is formed in the magnetic head 3 by the so-called abutting gap method. With reference to FIG. 51

2 showing this method, the gap spacer 4 is formed by preparing a pair of substrates 6, 8 for providing core segments 13, 52, forming a nonmagnetic layer for providing the spacer 4 on each of opposed faces of the two substrates 6, 8 and then joining the substrates 6, 8 under pressure in abutting relationship. The resulting assembly of the substrates 6, 8 is sliced to obtain magnetic heads 3.

The applicant has found that the magnetic head described should be improved with respect to the following.

1. The face of the conventional magnetic head 3 to be opposed to the hard disk has an exposed magnetic material even at a portion of the second core segment 52 which portion is away from the gap portion. However, the magnetic material of such a portion is not needed for recording or reproduction, rather contributing to an increase in the inductance of the magnetic head 3.

Furthermore, the internal magnetic resistance of the second core segment 52 should be diminished for the smooth passage of magnetic flux through the second core segment 52.

2. When the two substrates 6, 8 are pressed against each other for forming the gap spacer 4 in either of the foregoing heads, difficulty is encountered in pressing the substrates 6, 8 in intimate contact with each other uniformly at every portion along their length. Accordingly, when the assembly of the substrates 6, 8 is sliced into magnetic heads 3, the thickness of the gap spacer 4, i.e., the gap length t, varies from head to head. Needless to say, the variations in gap length greatly affect the magnetic characteristics.

3. The gap depth d produces a great influence on the magnetic characteristics. It is therefore desired that the gap depth d be readily checkable during the fabrication of magnetic heads 3.

SUMMARY OF THE INVENTION

An object of the present invention is to provide a magnetic head permitting smooth passage of magnetic flux in its interior without necessitating an increased inductance value.

Another object of the invention is to provide a magnetic head which can be manufactured in quantities with the variation in gap length diminished to eliminate variations in magnetic characteristics.

Still another object of the invention is to provide a magnetic head which is so adapted that the gap depth can be readily checked during the fabrication thereof.

According to the present invention, a second abutting segment 2 having a face to be opposed to a recording medium and formed by a nonmagnetic material is abutted against and joined to a first abutting segment 1 having a gap portion exposed on a face thereof to be opposed to the recording medium and comprising a first ferromagnetic thin film 11, a gap spacer 4 and a second ferromagnetic thin film 12. Since any magnetic material unnecessary for recording and reproduction is not exposed on the face of the second abutting segment 2 to be opposed to the recording medium, the magnetic head of the present invention has a decreased inductance value and improved magnetic characteristics.

Furthermore, the second ferromagnetic thin film 12 and the gap spacer 4, each as formed, for example, by sputtering, are shaped as by etching along with the first ferromagnetic thin film 11. Consequently, the thickness of the gap spacer 4, i.e., gap length t, and the gap width are diminished in variation, whereby magnetic heads 3 can be manufactured with decreased variations in magnetic characteristics.

When the second ferromagnetic thin film 12 is caused to be exposed on the lateral side of the magnetic head 3, the gap depth can be readily recognized during the fabrication of the head 3.

DESCRIPTION OF THE PREFERRED EMBODIMENTS

Figure 1:
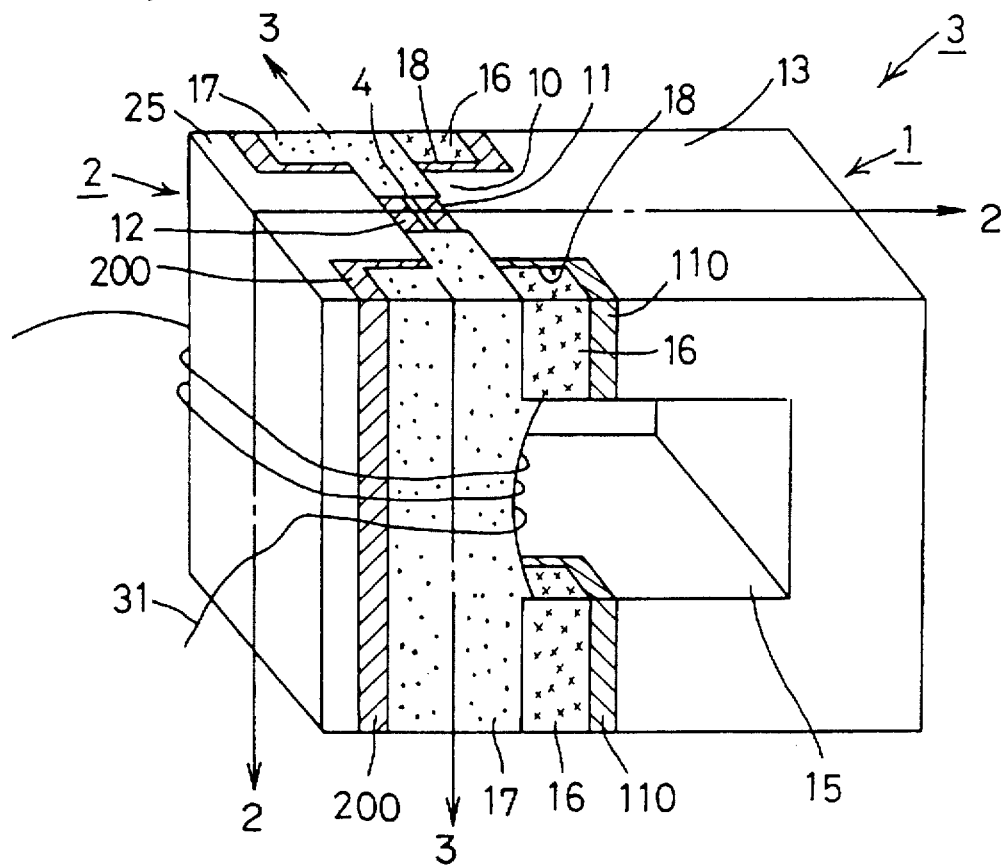
FIG. 1 is a perspective view of a magnetic head of first embodiment.

Magnetic heads embodying the present invention will be described below. Like parts already described with reference to the conventional head will be designated by like reference numerals and will not be described repeatedly.

Figure 47:
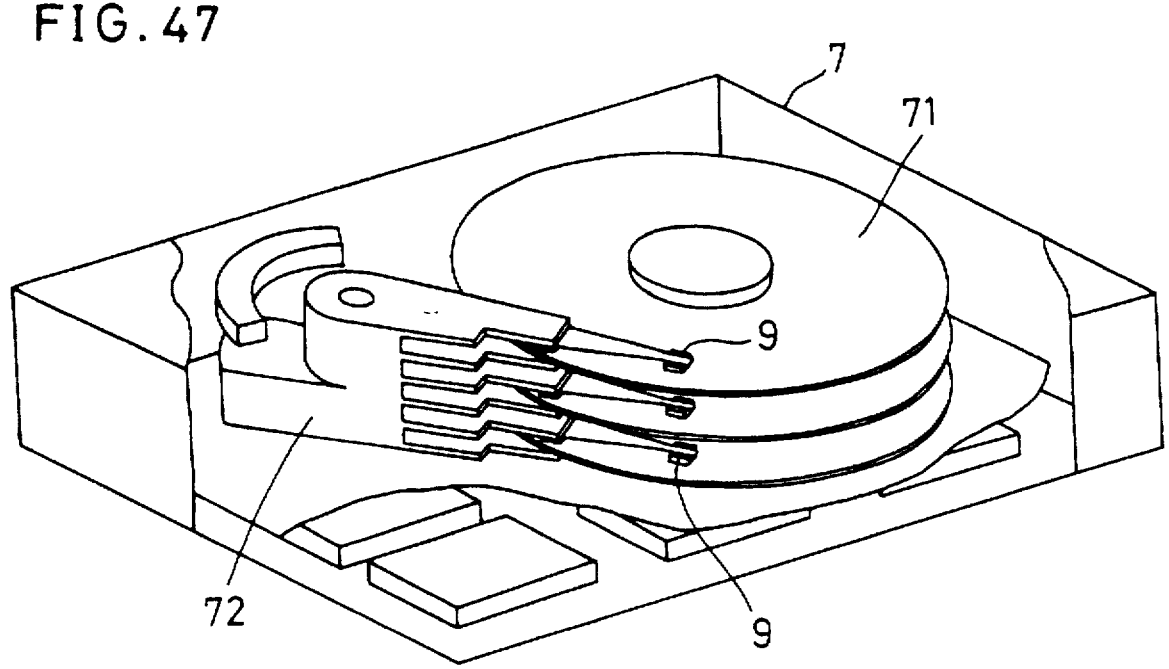
FIG. 47 is a perspective view showing the interior of a device provided with hard disks.

The magnetic heads to be described below are for use in hard disk drive devices. As shown in FIG. 47, the hard disk drive device has a main body 7, wherein a plurality of hard disks 71 are arranged one above another in parallel and rotated by an unillustrated rotating mechanism. The device main body 7 has disposed therein a head support mechanism 72 carrying magnetic head sliders 9 at arm ends for the respective hard disks 71. Owing to an air pressure resulting from high-speed rotation of the hard disk 71, the magnetic head slider 9 is levitated at a position tens of nanometers above the disk for recording signals on or reproducing signals from the hard disk 71.

Figure 48:
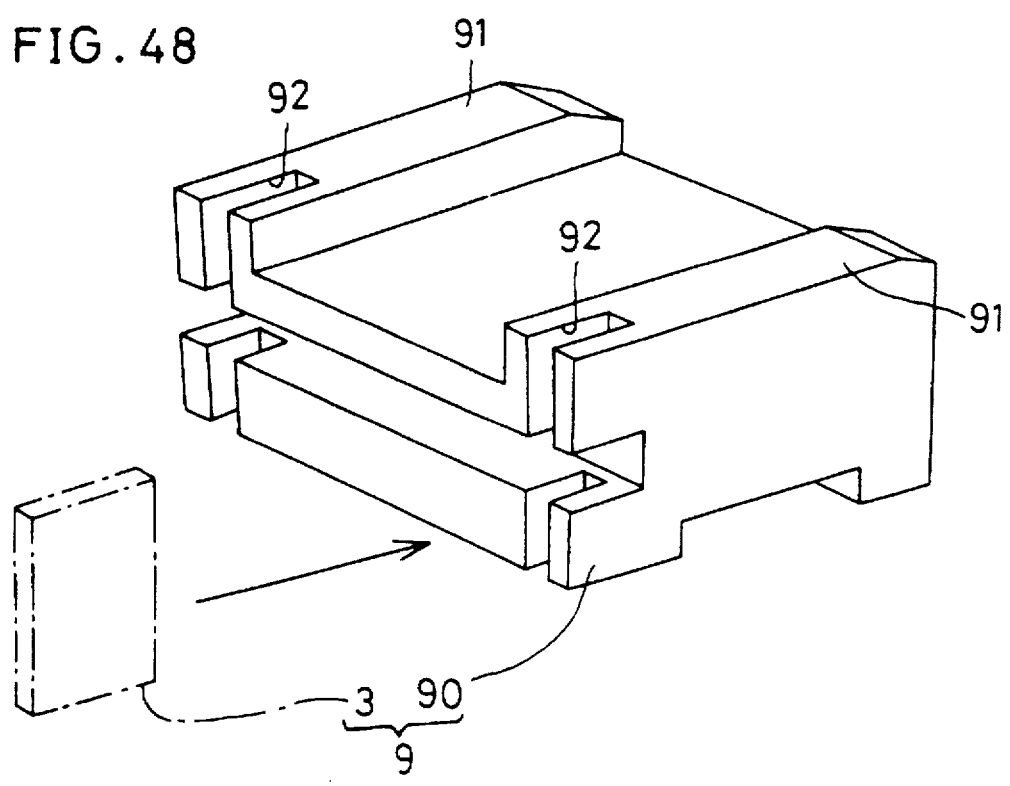
FIG. 48 is a perspective view of a slider body.
Figure 49:
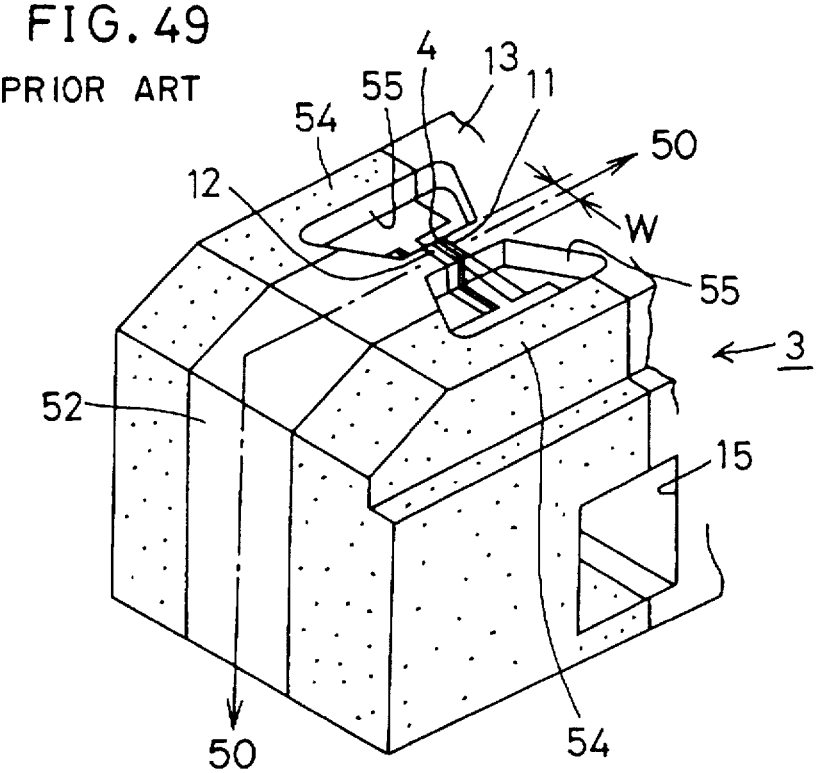
FIG. 49 is a perspective view of a conventional magnetic head.
Figure 50:
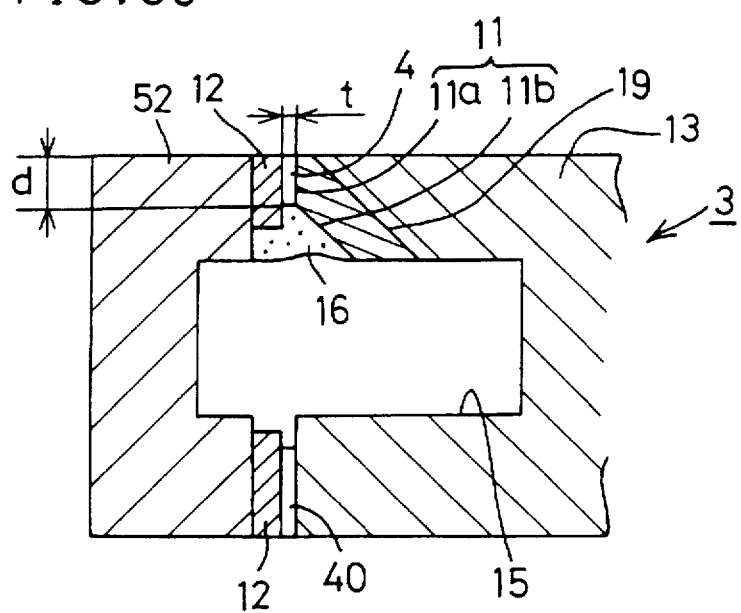
FIG. 50 is a view showing the magnetic head in section taken along the line Q—Q in FIG. 49.
Figure 51:
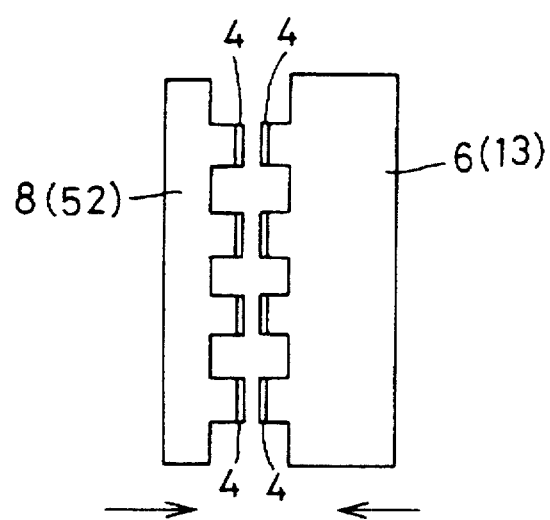
FIG. 51 is a diagram showing a method of forming a gap spacer in the conventional magnetic head.

With reference to FIG. 48, the head slider 9 comprises a slider body 90 having an upper surface providing air bearing portions 91, and magnetic heads 3 fixedly fitted in respective fitting grooves 92 formed in the body 90. The embodiments, i.e., magnetic heads 3, to be described below are all of the MIG type and characterized by a structure in the vicinity of the gap.

FIRST EMBODIMENT

Figure 2:
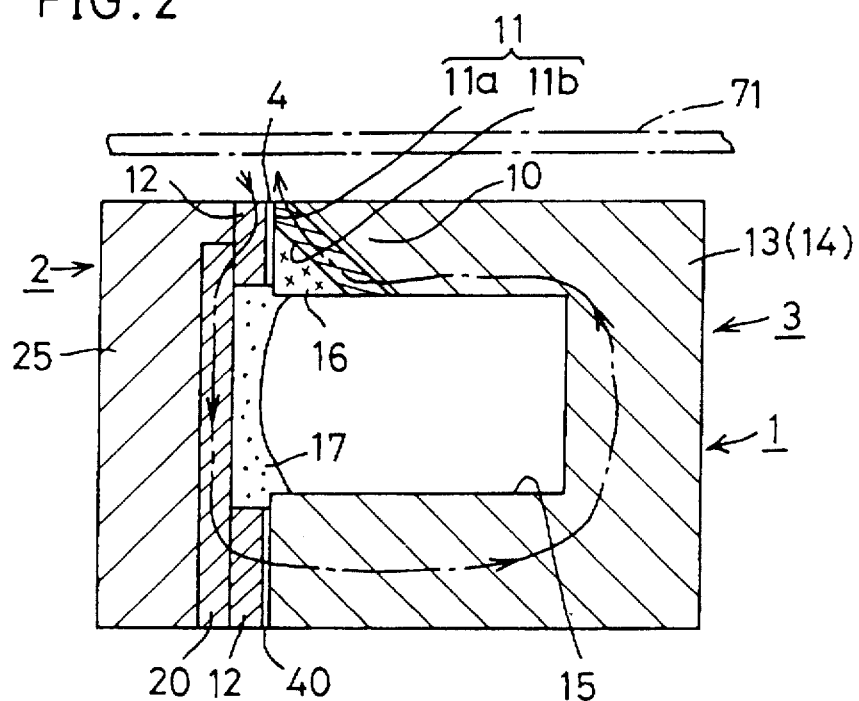
FIG. 2 is a view in section taken along the line A—A in FIG. 1.
Figure 3A:
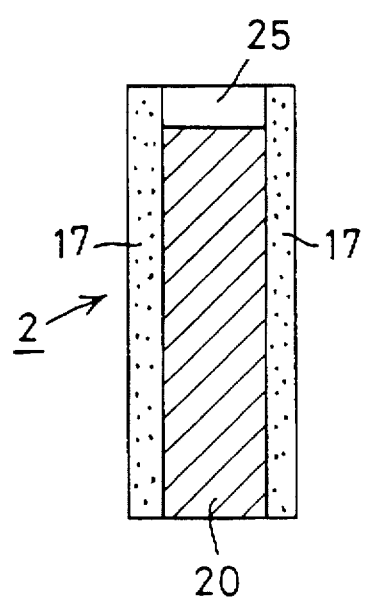
FIG. 3A is a left side view in section taken along the line B—B in FIG. 1.
Figure 3B:
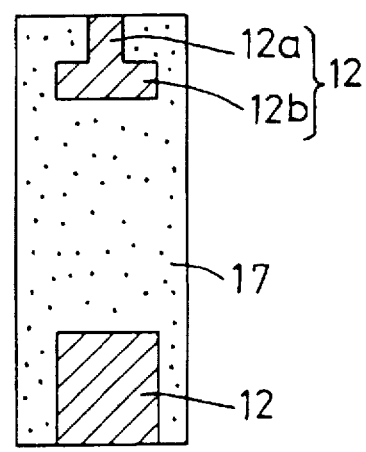
FIG. 3B is a right side view of the same.

FIG. 1 is a perspective view of a magnetic head 3, FIG. 2 is a view in section taken along the line A—A in FIG. 1, and FIGS. 3A and 3B are respectively a left side view and a right side view showing the head 3 in section taken along the line B—B in FIG. 1. The magnetic head 3 comprises a first abutting segment 1 formed with a winding groove 15 having an open front side, and a second abutting segment 2 having a nonmagnetic material exposed on its upper face and joined to the segment 1 in abutting relationship thereto. A winding 31 is provided around the second abutting segment 2 through the groove 15. The upper surface of the head 3 is to be opposed to a hard disk serving as a recording medium.

The first abutting segment 1 comprises a first core segment 13 formed with the winding groove 15, and a nonmagnetic gap spacer 4, 40 and a second ferromagnetic thin film 12 of FeAlSi alloy, FeTaN alloy or the like which are formed on the front face of the segment 13 as by sputtering. The gap spacer is divided into two portions, i.e., a gap spacer 4 positioned toward the opposed surface and above the groove 15 and a lower gap spacer 40 positioned below the groove 15.

The first core segment 13 comprises a core segment member 14 made of a ferromagnetic material such as Mn-Zn ferrite, and a first ferromagnetic thin film 11 made of FeAlSi alloy, FeTaN alloy or the like and formed on the front face of an upper projection of the member 14. The projection 10 is formed in its lateral sides with cutouts 18, 18 for filling a first glass 16 in.

The front face of the projection 10 is inclined obliquely inward, and the first ferromagnetic thin film 11 formed on the front face has a vertical face 11a having an exposed upper end at the surface to be opposed to the hard disk, and a slanting face 11b continuously extending obliquely inward from the lower end of the vertical face 11a. Formed on the slanting face 11b is a layer of first glass 16 having a front face flush with the vertical face 11a.

The second abutting segment 2 comprises a base 25 of nonmagnetic material, and a third ferromagnetic thin film 20 formed on the base 25 and having an outer face flush with the surface of the base to be opposed to the first abutting segment 1. The third thin film 20 is made of FeAlSi alloy, FeTaN alloy or the like and joined at its upper and lower end portions to the second thin film 12, and has its upper end positioned inward of the surface to be opposed to the hard disk. The second ferromagnetic thin film 12 comprises a portion 12a of a small width approximately equal to the track width of the hard disk, and a portion 12b of large width integral with the small-width portion 12a and in contact with the third thin film 20 as shown in FIG. 3B. In the vicinity of the gap portion, therefore, the upper end portion of the third thin film 20 is not exposed on the surface to be opposed to the hard disk, but the upper face of the base 25 of nonmagnetic material is exposed.

As shown in FIG. 1, the first thin film 11, upper and lower gap spacers 4, 40, second thin film 12 and first abutting segment 1 have their lateral sides covered with a second glass 17 having a lower melting point than the first glass 16. The third thin film 20 has a thickness of several micrometers, and the second abutting segment 2 has a thickness of more than 100 micrometers.

In the following description, the term "core segment" refers to the component on either side of the gap spacer 4, among other components of the magnetic head 3. The magnetic material portion of the second abutting segment 2 and the second ferromagnetic thin film 12 of the present embodiment correspond to the conventional second core segment 52.

During the playback of the hard disk, counterclockwise magnetic flux passes through the second thin film 12, third thin film 20 and core segment member 14 and emanates from the first thin film 11 toward the hard disk as indicated in a broken line in FIG. 2. The vertical face 11a of the first thin film 11 opposed to the second thin film 12 via the upper gap spacer 4 has a small area, so that the magnetic resistance encountered is great, and the magnetic flux does not penetrate through the upper gap spacer 4. The magnetic flux passes through the large-width portion 12b where the second thin film 12 is in contact with the third thin film 20, therefore encounters diminished magnetic resistance and smoothly passes through the third thin film 20.

Further because the lower gap spacer 40 is opposed to the second thin film 12 over a large area, the magnetic resistance is small, permitting the magnetic flux to smoothly pass through the lower gap spacer 40. The magnetic flux thus passing through the head causes the coil 31 to deliver a reproduction output.

FIG. 1 shows that the remaining portions 200, 110 of the third thin film 20 and the first thin film 11 are exposed on the upper surface and side surface of the magnetic head 3, whereas this is attributable to the mode of fabrication of the magnetic head 3 and is not a technical feature of the present invention. Although the remaining portion 200 of the third thin film 20 is exposed on the upper surface of the head 3 shown in FIG. 1 and to be opposed to the hard disk, this portion is away from the upper gap spacer 4 at the opposed surface and therefore produces no influence on the magnetic characteristics of the magnetic head 3.

The magnetic head 3 is produced by the following process.

Figure 4:
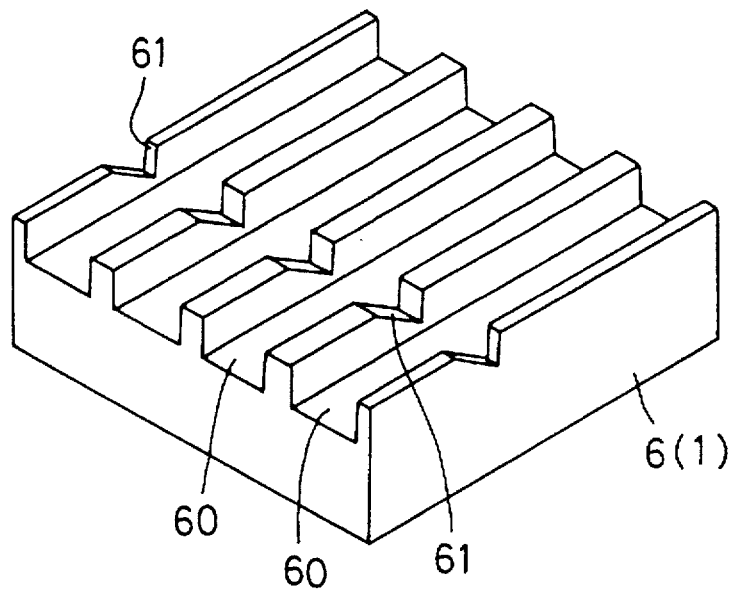
FIG. 4 is a perspective view of a large substrate formed with first preliminary grooves and a depth end groove.
Figure 5:
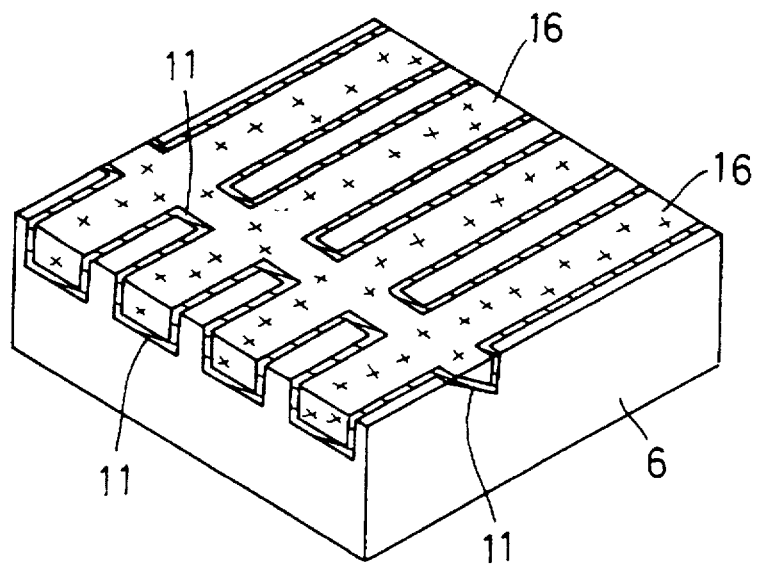
FIG. 5 is a perspective view of the large substrate of FIG. 4 as filled with a first glass.

First as shown in FIG. 4, first preliminary grooves 60, 60 are formed with a constant pitch in the upper surface of a large substrate 6 made of Mn-Zn ferrite for providing the first abutting segment 1. A depth end groove 61 of triangular cross section is then formed in the substrate 6 so as to be orthogonal to the grooves 60. Next, the large substrate 6 is coated with a first ferromagnetic thin film 11 over the entire upper surface thereof, and filled with a first glass 16 over the thin film 11. The resulting upper surface is thereafter ground and polished to cause the first thin film 11 to be exposed in section in the same plane as the first glass 16 as seen in FIG. 5.

Figure 6:
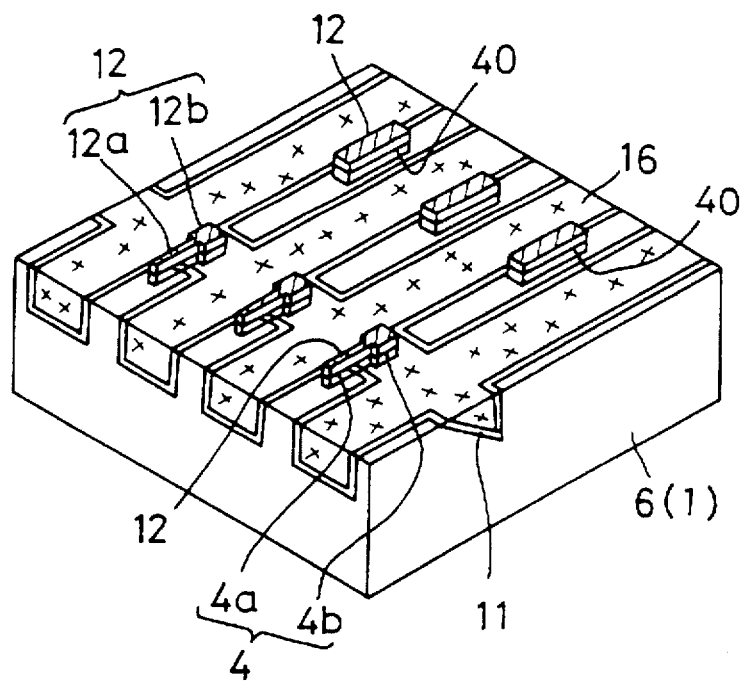
FIG. 6 is a perspective view of the large substrate as subjected to an etching step.

Subsequently, a nonmagnetic thin film for providing the gap spacers 4, 40 and a second ferromagnetic thin film 12 superposed thereon are formed on the upper surface of the large substrate 6 as by sputtering, followed by the formation of a resist pattern and etching, whereby portions for providing upper gap spacers 4 and lower gap spacers 40 are allowed to remain as shown in FIG. 6. The ion beam etching process is generally used for the etching treatment.

Figure 7:
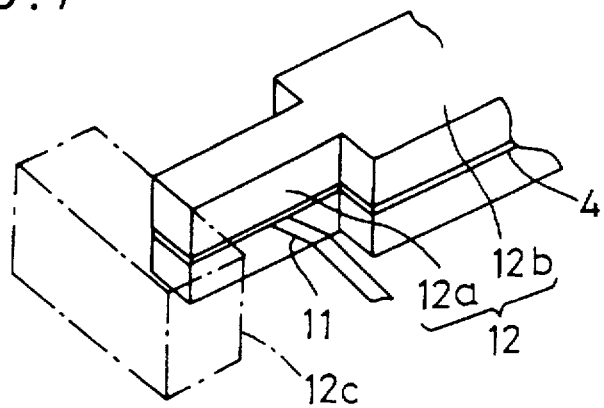
FIG. 7 is a fragmentary perspective view of the large substrate formed with an elongated portion.

The lower gap spacer 40 has a larger area than the upper gap spacer 4, and these gap spacers 4, 40 are formed in the same shape as the overlying second thin film 12. More specifically, the upper gap spacer 4 comprises a small-width portion 4a and a large-width portion 4b integral with, and positioned inward of, the portion 4a. The upper end of the first thin film 11 is given the same width as the small-width portions 4a, 12a by the etching step (see FIG. 7).

The small-width portions 4a, 12a of the gap spacer 4 and the second thin film 12 are formed by the etching treatment along with the first thin film 11, whereby the widths of the small-width portions 4a, 12a and the first thin film 11 are accurately determined in conformity with the track width. Further as indicated in a broken line in FIG. 7, an elongated portion 12c wider than the small-width portion 12a may be formed at the outer end of the portion 12a, followed by the removal of the elongated portion 12c by the subsequent step. We have found that this method gives an accurate widthwise dimension to the small-width portion 12a.

Figure 8:
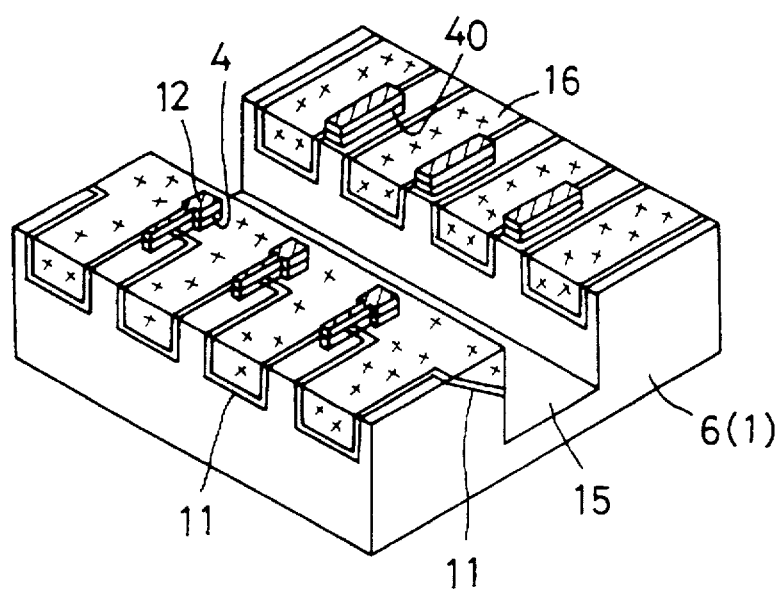
FIG. 8 is a perspective view of the large substrate of FIG. 6 as formed with a winding groove.

With reference to FIG. 8, a winding groove 15 is thereafter formed between the upper and lower gap spacers 4, 40.

Figure 9:
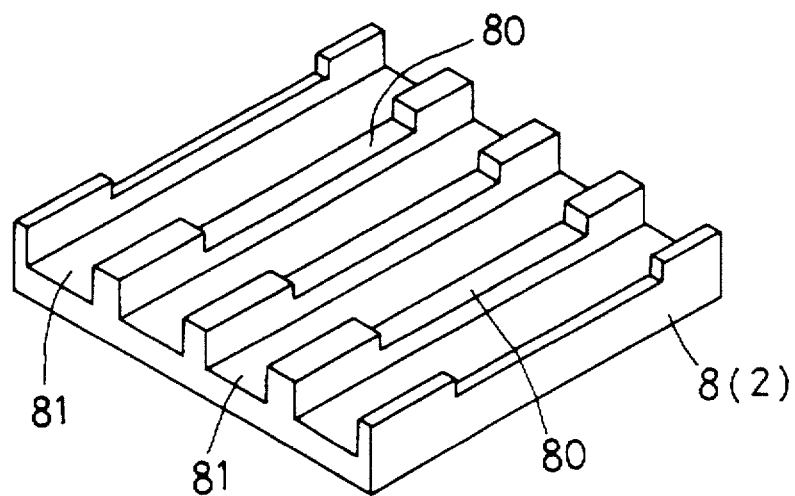
FIG. 9 is a perspective view of a small substrate formed with second preliminary grooves and a groove.
Figure 10:
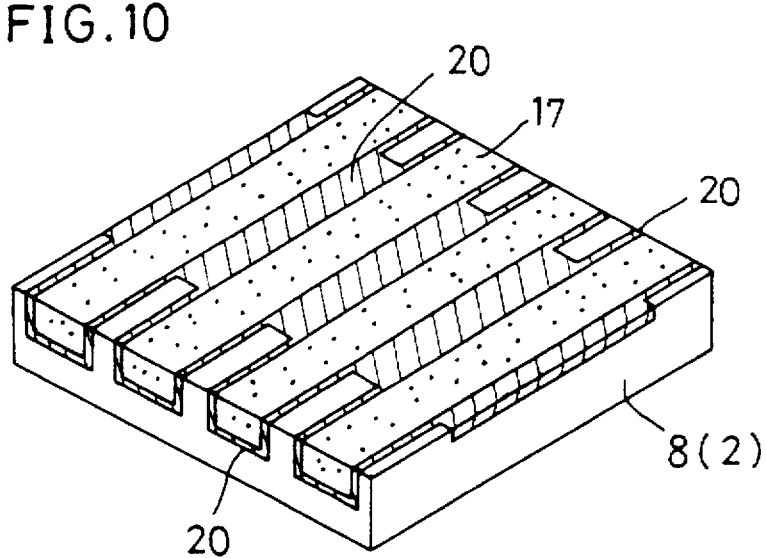
FIG. 10 is a perspective view of the small substrate of FIG. 9 as filled with a second glass.

On the other hand, the second abutting segment 2 to be abutted on the first abutting segment 1 is prepared in the following manner. With reference to FIG. 9, a groove 80 for forming a third ferromagnetic thin film 20 therein and second preliminary grooves 81 deeper than the groove 80 are formed in the upper surface of a small substrate 8 made of alumina ceramic or the like. Next as shown in FIG. 10, the small substrate 8 is coated with the third ferromagnetic thin film 20 as by sputtering over the entire upper surface thereof, and then filled with a second glass 17 over the thin film 20. The resulting upper surface is thereafter ground and polished to a planar form to expose the third thin film 20 in section on the same plane as the second glass 17.

Figure 11:
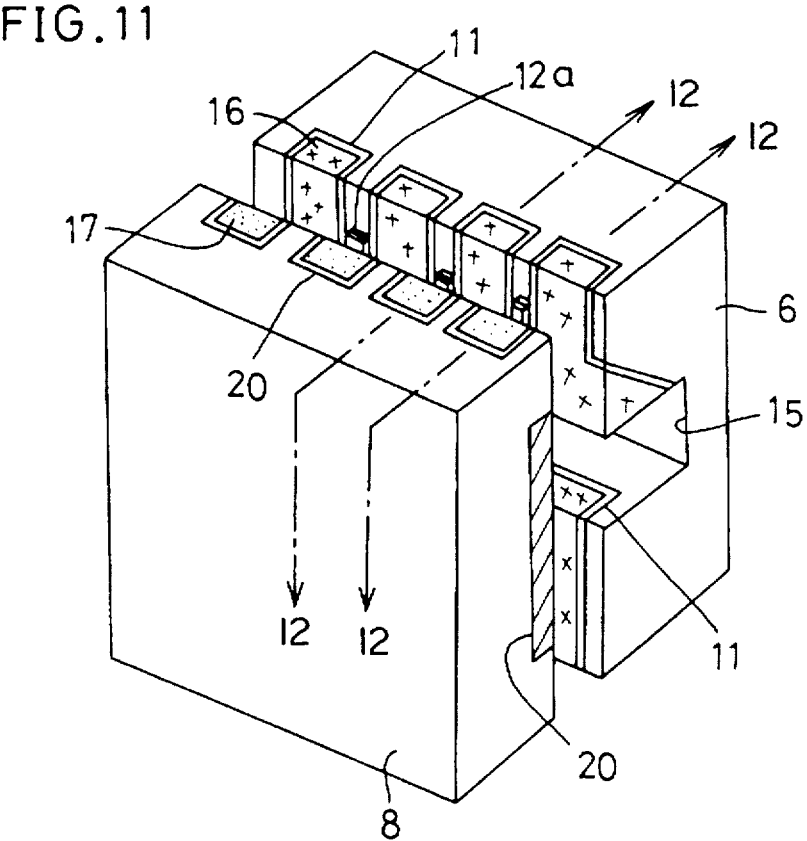
FIG. 11 is a perspective view showing the large substrate and the small substrate as abutted thereagainst.
Figure 12:
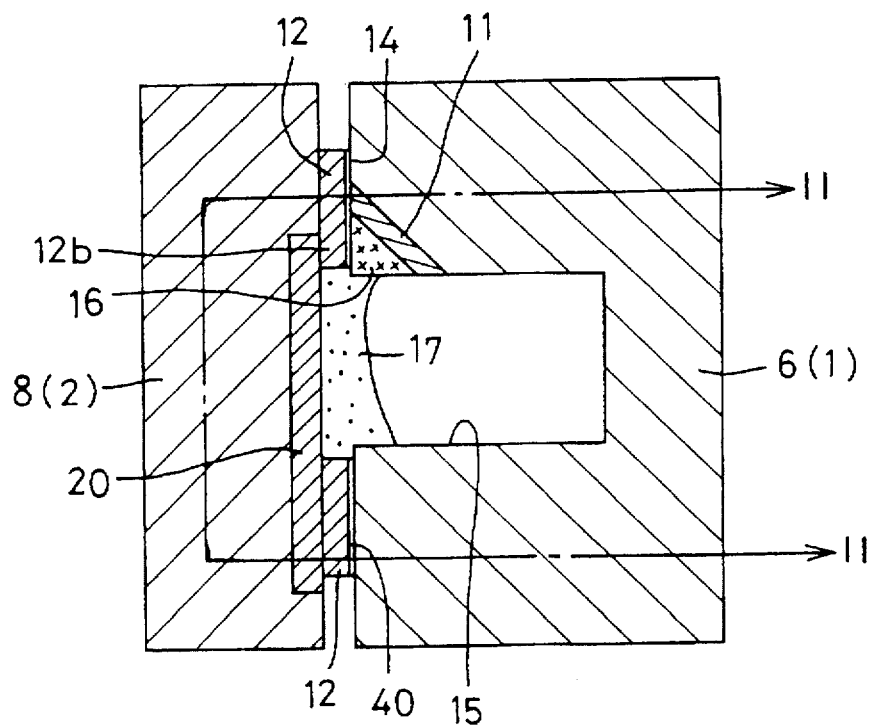
FIG. 12 is a central sectional view of a block obtained by cutting the assembly of the large and small substrates of FIG. 11 along the lines P—P in FIG. 11.

As shown in FIG. 11, the small substrate 8 is abutted against the large substrate 6, and the assembly is heated to melt the second glass 17 only. The second glass 17 filling the second preliminary grooves 81 flows sideways beneath the gap portions, bonding the small substrate 8 to the large substrate 6. The assembly is thereafter sliced into blocks along the lines P—P. FIG. 12 is a central sectional view showing the block thus obtained. In this state, each block is cut along the line C—C and line D-C to remove unnecessary portions and obtain a magnetic head 3.

With the magnetic head 3 fabricated by the foregoing process, the second abutting segment 2 has a nonmagnetic face exposed on the surface of the head to be opposed to the hard disk, and the third thin film 20 is not exposed on the surface to be opposed to the hard disk in the vicinity of the gap portion, so that the area of the magnetic material exposed on the surface to be opposed to the hard disk is smaller than in the conventional magnetic head 3. Thus, any magnetic material unnecessary for recording and reproduction is not exposed on the face of the secondary abutting segment 2 to be opposed to the recording medium, consequently decreasing the inductance value of the head 3 and improving the magnetic characteristics thereof.

Further the nonmagnetic material providing the face of the second abutting segment 2 to be opposed to recording medium obviates the likelihood that stray flux will occur in the segment 2 in the vicinity of the gap portion. The term the "stray flux" refers to flux other than the main flux passing through the magnetic head 3 in circulation (see FIG. 39).

The second ferromagnetic thin film 12 and the gap spacer 4 as formed, for example, by sputtering are shaped as by etching along with the first ferromagnetic thin film 11.

Consequently, variations in the gap length are diminished to decrease the variations in the magnetic characteristics of the magnetic head 3.

The second thin film 12 is joined to the third ferromagnetic thin film 20 at a position inward of the surface to be opposed to the hard disk. This gives an increased area to the joint, i.e., to the large-width portion 12b of the second thin film 12. As a result, an increase in the magnetic resistance of the joint is avoidable, permitting the main flux to smoothly pass from the second thin film 12 to the third ferromagnetic thin film 20.

Further the thickness of the second abutting segment 2 is equal to that of the conventional second core segment 52, while the base 25 of the segment 2 is made of a ceramic or the like. It is therefore unlikely that the present head 3 will be inferior to the conventional head 3 in mechanical strength.

In order to reinforce the joint between the third thin film 20 and the large-width portion 12b of the second thin film 12, it is desirable to form an $SiO_2$ film of about 20 nm in thickness and a glass film of about 45 nm in thickness as superposed on the abutting face of at least one of the thin films 20, 12 before the joining step illustrated in FIG. 11.

It is then likely that the formation of these films will result in increased magnetic resistance. However, the present applicant has found that the increase in the magnetic resistance is not so great as to be objectionable to actual use since the large-width portion 12b of the second thin film 12 joined to the third thin film is sufficiently great relative to the small-width portion 12a.

Further to prevent the erosion of the side faces of the first and second thin films 11, 12 by the molten second glass 17, a Cr film with a thickness of about 10 nm may be interposed between the $SiO_2$ and glass films.

Figure 43:
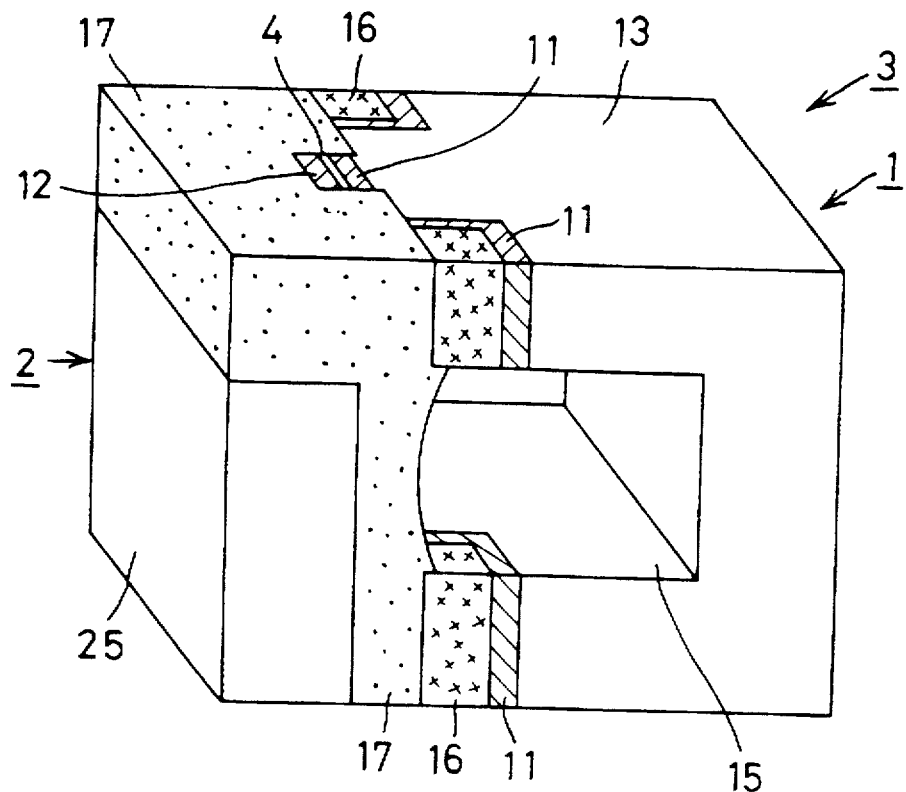
FIG. 43 is a perspective view showing a magnetic head as an application example of the first embodiment.
Figure 44:
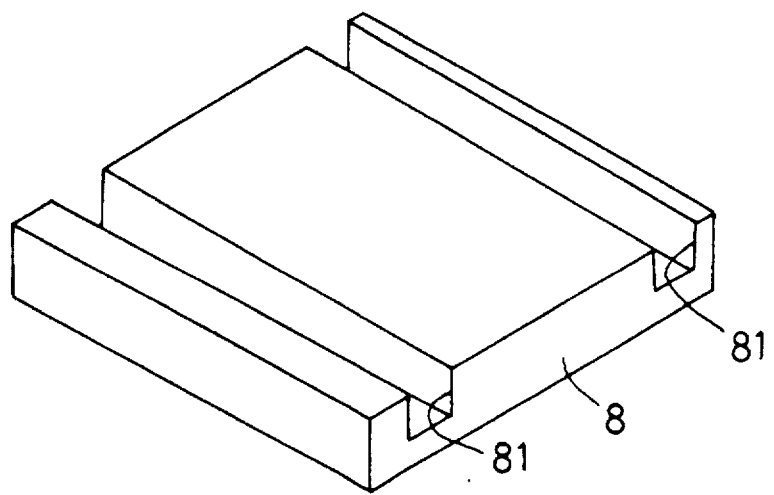
FIG. 44 is a perspective view of a small substrate for use in the magnetic head of FIG. 43.
Figure 45:
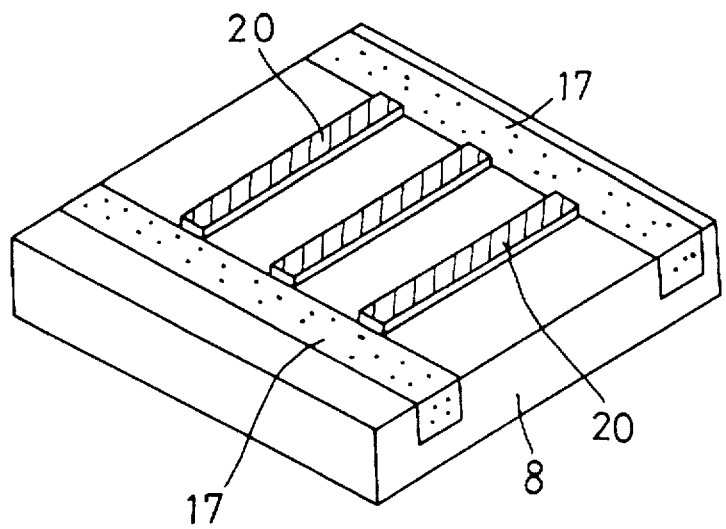
FIG. 45 is a perspective view showing the small substrate of FIG. 44 as formed with a third ferromagnetic thin film and filled with a second glass.
Figure 46:
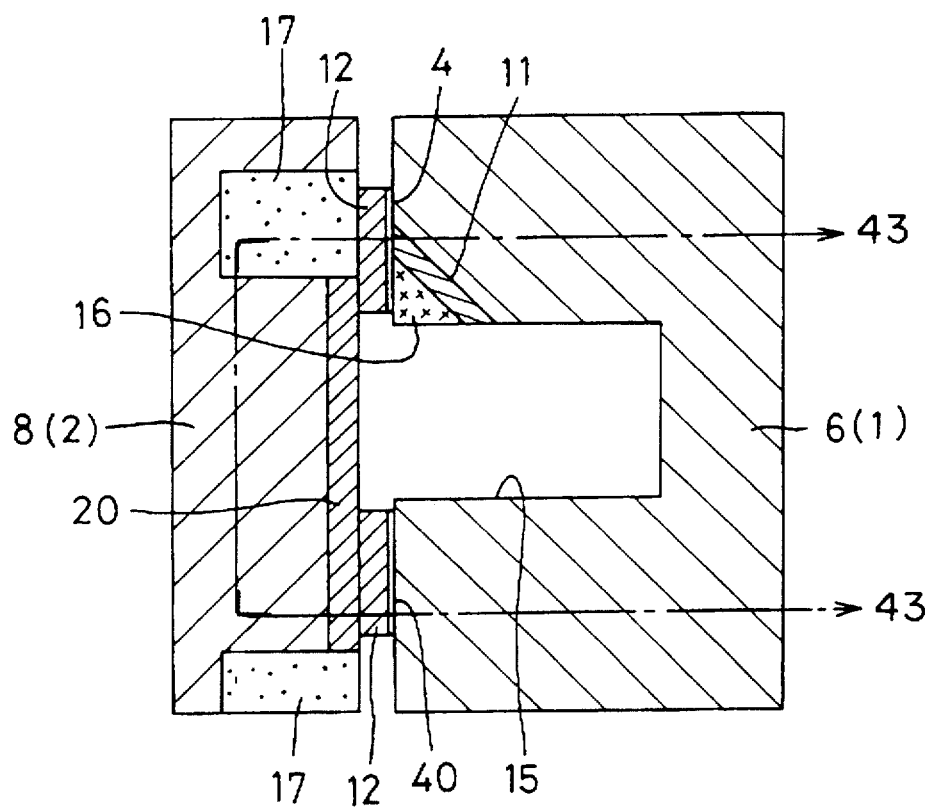
FIG. 46 is a sectional view showing the small substrate of FIG. 45 in use for fabricating the magnetic head.

The present applicant has proposed a magnetic head 3 as an application example of the first embodiment as shown in FIG. 43. The proposed head has a layer of second glass 17 covering the upper face of the second abutting segment 2. To produce the magnetic head 3, second preliminary grooves 81, 81 are formed respectively in front and rear end portions of a small substrate 8 of nonmagnetic material as shown in FIG. 44 and filled with a second glass 17 as seen in FIG. 45. The upper surface of the substrate is then ground and polished, and a third ferromagnetic thin film 20 is formed on the substrate by sputtering, followed by etching to expose the thin film 20. The resulting small substrate 8 is abutted against and joined to the aforementioned large substrate 6 formed with the gap spacer 4 and the second thin film 12, the resulting assembly is sliced, and each block obtained is cut along the line C—C and line D—D shown in FIG. 46 to remove unnecessary portions and obtain the head 3 shown in FIG. 43.

SECOND EMBODIMENT

Figure 13:
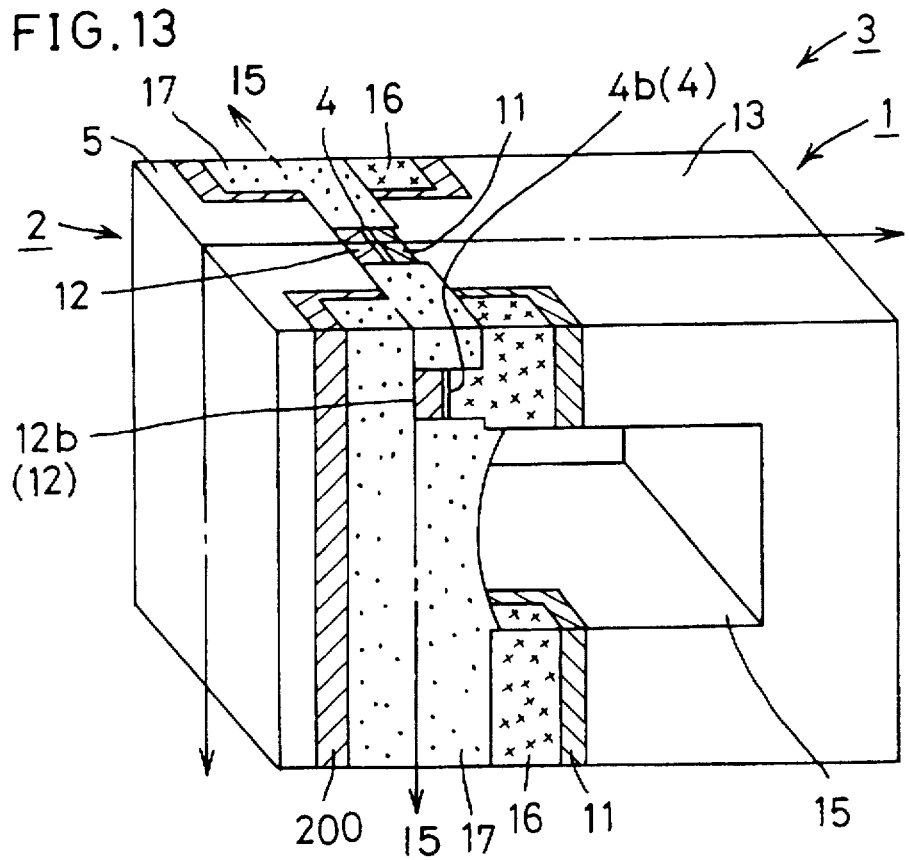
FIG. 13 is a perspective view of a magnetic head of second embodiment.
Figure 15:
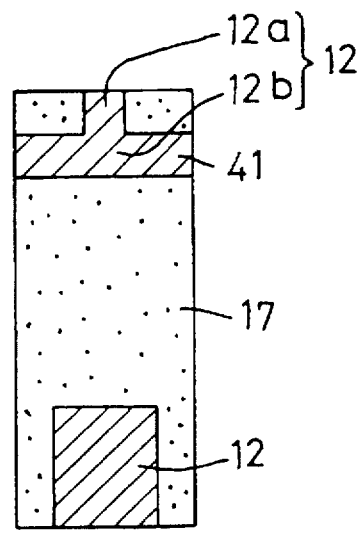
FIG. 15 is a right side view in section taken along the line F—F in FIG. 13 and showing the magnetic head.

FIG. 13 shows a modification of the magnetic head 3 of FIG. 1. FIG. 15 is a right side view showing the head 3 of FIG. 13 in section taken along the line F—F in FIG. 13. The left side view showing the head 3 in section taken along the line F—F is the same as FIG. 3A. The head differs from the head 3 shown in FIG. 1 in that the large-width portions 12b, 4b of the second ferromagnetic thin film 12 and the gap spacer 4 are exposed on the lateral sides of the head 3, with the result that the gap depth d can be readily recognized during the fabrication of the magnetic head 3.

The line of intersection of the vertical face 11a and the slanting face 11b of the first thin film 11 will be referred to as a "depth end line." After the completion of the magnetic head 3, the depth end line can not be observed directly from one side of the winding groove 15. However, if the position of the large-width portion 12b exposed on the lateral face of the grooved portion 15 relative to the depth end line is accurately determined in forming the second thin film 12, an observation of the large-width portion 12b from the lateral side of the groove 15 of the head 3 as completed directly indicates the depth end line of the head 3.

Figure 14:
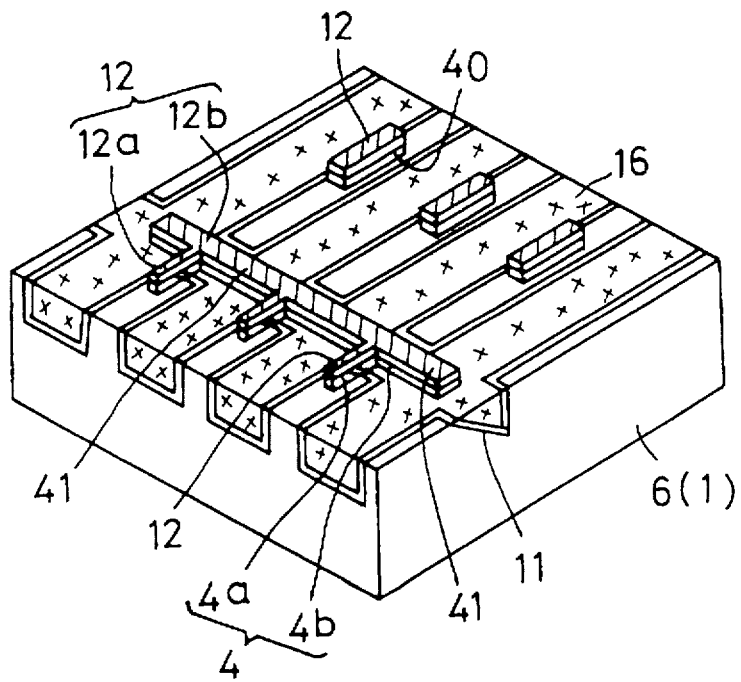
FIG. 14 is a perspective view of an etched large substrate for use in the magnetic head of FIG. 13.
Figure 16:
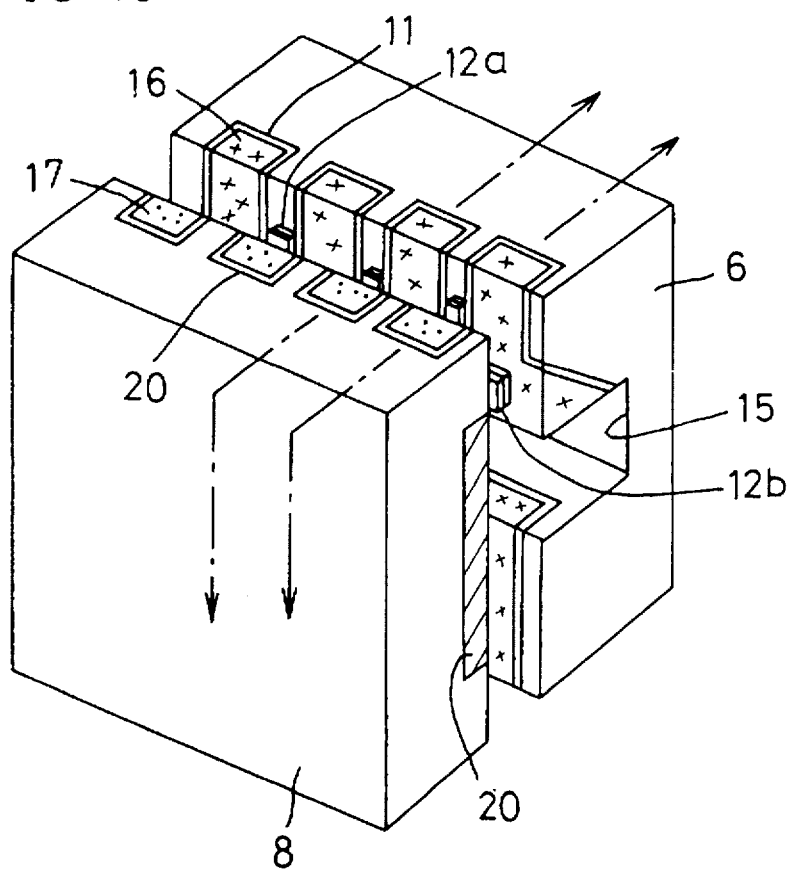
FIG. 16 is a perspective view showing the large substrate and a small substrate as abutted thereagainst.

While the magnetic head 3 is fabricated by a process substantially the same as the foregoing process for producing the first embodiment, the large-width portions 4b, 12b of the upper gap spacers 4 and the second thin film 12 which portions are to be aligned on the large substrate 6 are extended in the direction of the track width and interconnected by a connecting bar 41 by the step of etching the large substrate 6 as shown in FIG. 14. A winding groove 15 is formed in this state, and the small substrate 8 is then abutted on the large substrate 6 (see FIG. 16), followed by bonding with molten glass and slicing. Removal of unnecessary portions as in the foregoing process affords the magnetic head 3 shown in FIG. 13.

THIRD EMBODIMENT

Figure 17:
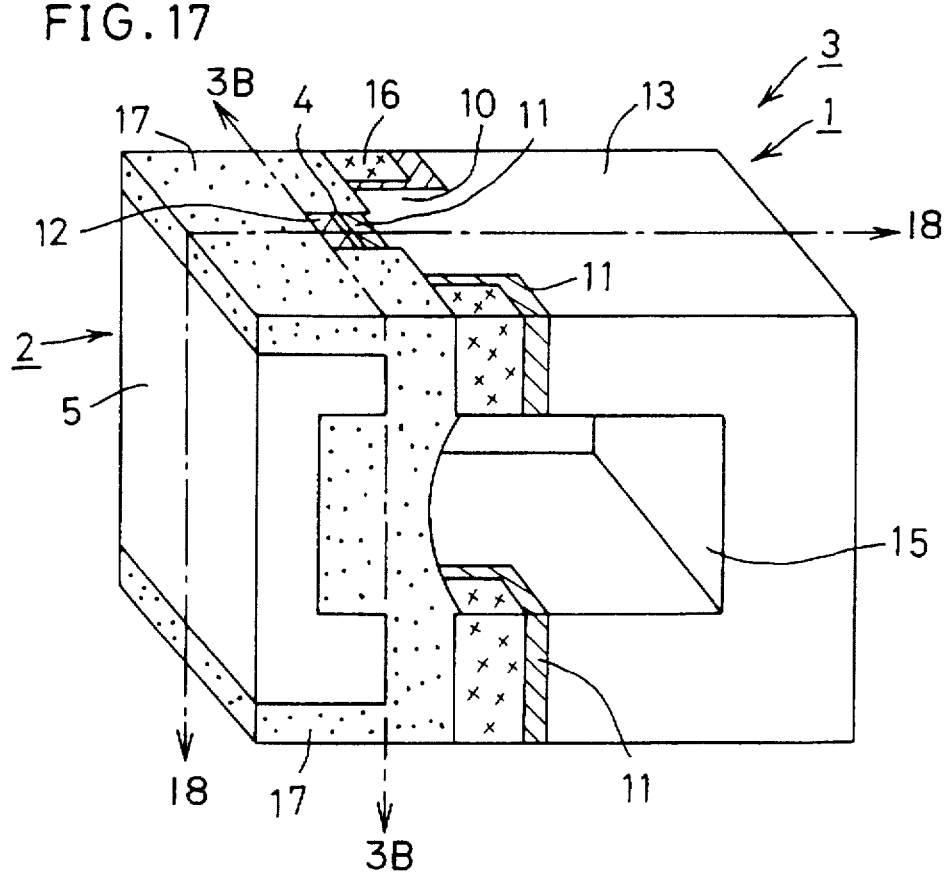
FIG. 17 is a perspective view of a magnetic head of third embodiment.
Figure 18:
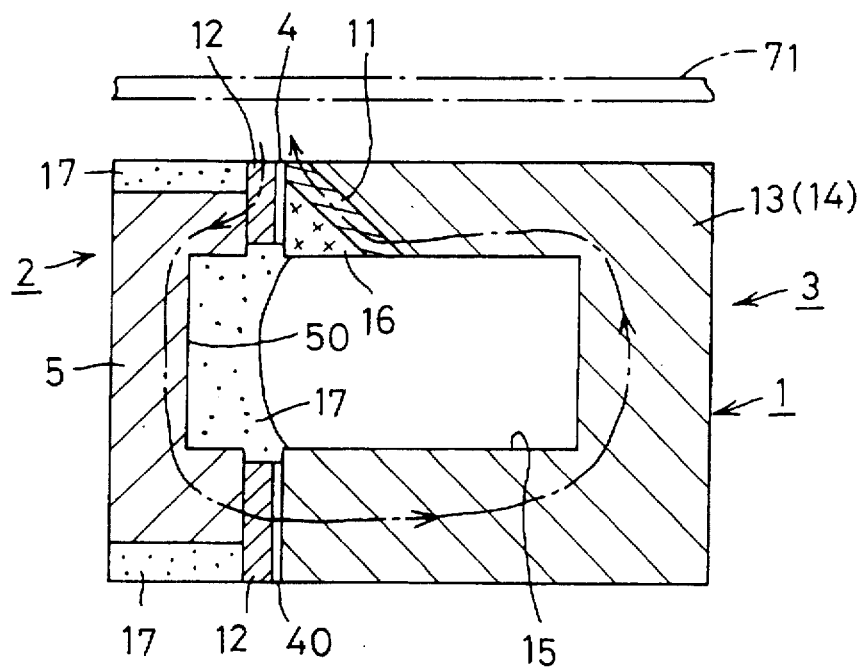
FIG. 18 is a view showing the magnetic head of FIG. 17 in section taken along the line G—G in FIG. 17.

FIG. 17 is a perspective view showing another magnetic head 3, and FIG. 18 is a view in section taken along the line G—G in FIG. 17 and showing the head 3. Like the first embodiment, the magnetic head 3 comprises a first abutting segment 1 and a second abutting segment 2 abutted against the front face of the segment 1. The second segment 2 comprises a substrate 5 of magnetic material having a face to be opposed to the hard disk and covered with a second glass 17 which is nonmagnetic and has a lower melting point than the first glass 16.

During the playback of the hard disk, counterclockwise magnetic flux passes through the second ferromagnetic thin film 12, second abutting segment 2, core segment member 14 and first ferromagnetic thin film 11 as indicated in a broken line in FIG. 18. With the present embodiment, the magnetic material portion of the second abutting segment 2, i.e. the substrate 5, and the second thin film 12 correspond to the conventional second core segment 52.

The third embodiment differs from the first embodiment only in the structure of the second abutting segment 2, but has the same first abutting segment 1 as the first embodiment, so that the magnetic head 3 of FIG. 17, as shown in section taken along the line H—H, appears the same as is shown in FIG. 3B.

The second abutting segment 2 is formed with a filling groove 50 in the center of its face to be opposed to the first abutting segment 1 for filling in the second glass 17. The second glass 17 in the groove 50 flows sideways under the gap portion upon melting, joining the abutting segments 1, 2.

The magnetic head 3 is fabricated by the process shown in FIGS. 19 to 22. The first abutting segment 1 is the same as that of the first embodiment and is prepared by the same method, which therefore will not be described.

Figure 19:
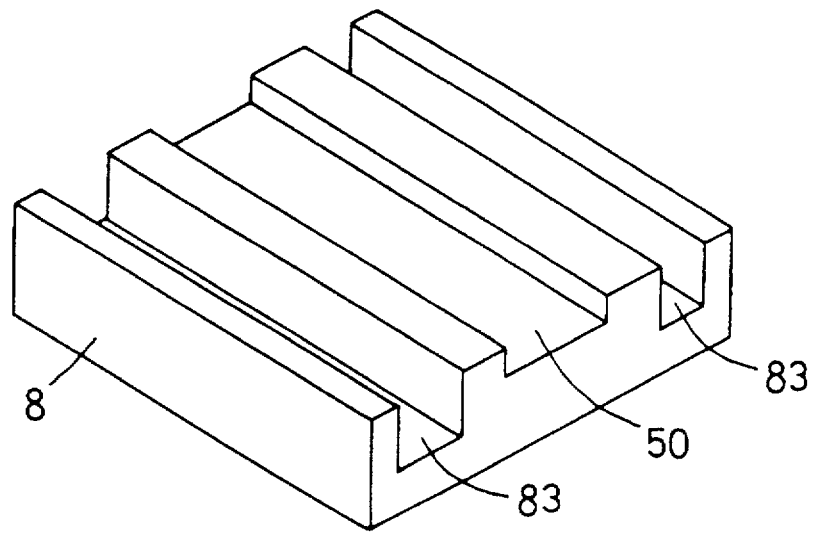
FIG. 19 is a perspective view of a small substrate formed with abutting grooves and a filling groove.

The second abutting segment 2 is prepared from a ferromagnetic small substrate 8 of Mn-Zn ferrite or the like, and a central filling groove 50 and abutting grooves 83, 83 deeper than the groove 50 and positioned at opposite sides of the groove 50 are formed in the upper surface of the small substrate 8 (see FIG. 19). The grooves 83, 83 are to be opposed respectively to the upper portion of the upper gap spacer 4 and the lower portion of the lower gap spacer 40 of the first abutting segment 1.

Figure 20:
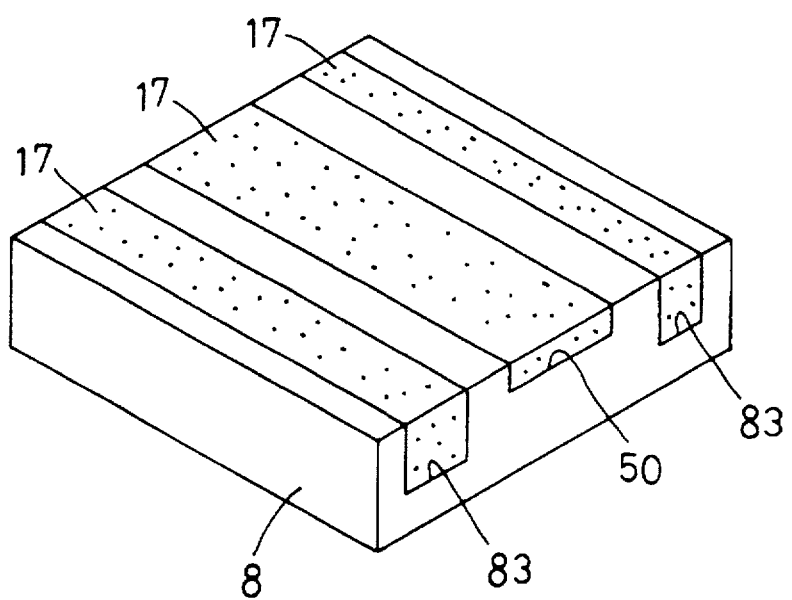
FIG. 20 is a perspective view of the small substrate of FIG. 19 as filled with a second glass.

With reference to FIG. 20, the filling groove 50 and the abutting grooves 83, 83 are then filled with a second glass 17, and the resulting upper surface is thereafter ground and polished to make the upper surface of the second glass 17 flush with the upper surface of ferromagnetic small substrate 8.

Figure 21:
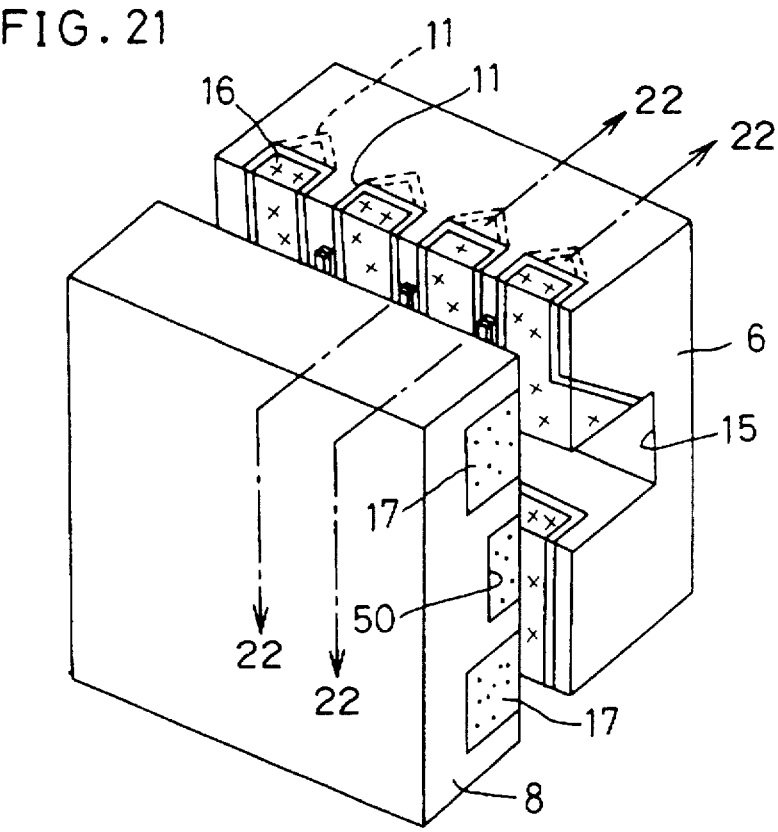
FIG. 21 is a perspective view of a large substrate and the small substrate as abutted thereagainst.
Figure 22:
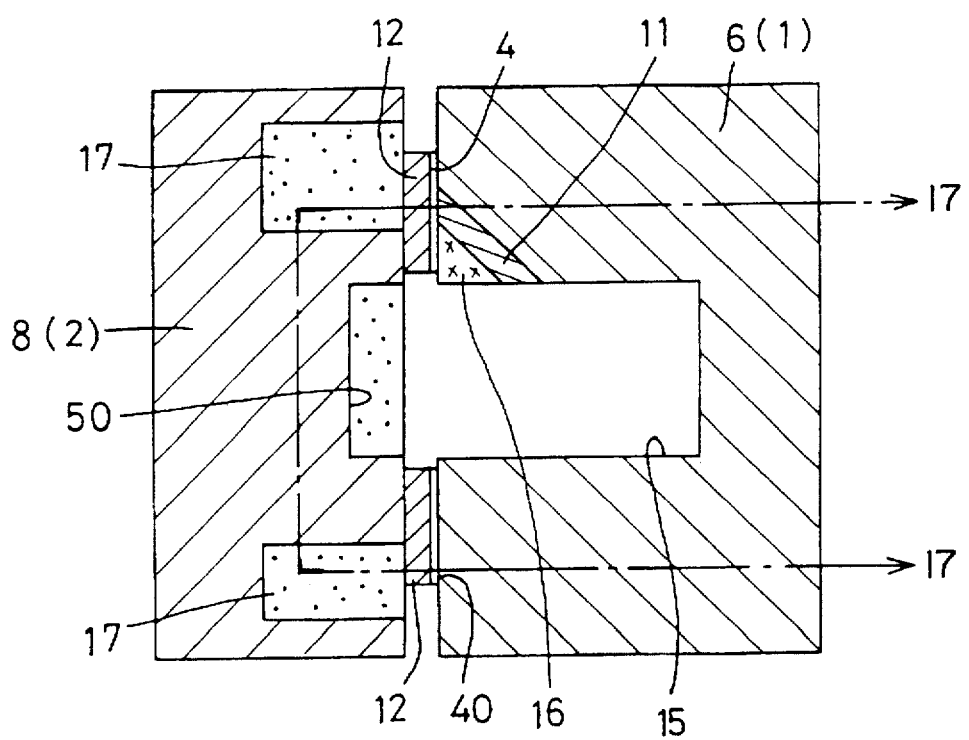
FIG. 22 is a central sectional view of a block obtained by cutting the assembly of the large and small substrates of FIG. 21 along the lines P—P in FIG. 21.

Next as shown in FIG. 21, the small substrate 8 is abutted against a large substrate 6 for providing the first abutting segment 1, and the assembly is heated in a furnace (not shown) to melt the second glass 17 only. The second glass 17 flowing out from the filling groove 50 joins the small substrate 8 to the large substrate 6.

In actuality, the heating furnace is set at a predetermined internal pressure with the small substrate 8 down, whereby the molten second glass 17 is allowed to flow in sideways of the gap portion by surface tension. Each of blocks obtained from the resulting assembly is thereafter cut along the lines C—C and D—D shown in FIG. 22 to obtain the magnetic head 3 shown in FIG. 17.

The $SiO_2$ film and the glass film described with reference to the first embodiment may be formed on at least one of the abutting faces of the second thin film 12 and the second abutting segment 2 before joining to give an improved joint strength.

As is the case with the first embodiment, the face of the second abutting segment 2 to be opposed to the hard disk is covered with a nonmagnetic material, so that the area of magnetic material exposed on the surfac to be opposed to the hard disk is smaller than in the conventional magnetic head 3. The present head therefore has a decreased inductance value and improved magnetic characteristics.

The second thin film 12 and the gap spacer 4 as formed, for example, by sputtering are shaped as by etching along with the first thin film. Accordingly, variations in the gap length are diminished to decrease the variations in the magnetic characteristics of magnetic heads 3.

Since the joint between the second thin film 12 and the second abutting segment 2 is away from the surface of the head to be opposed to the hard disk, the joint can be given an increased area. Consequently, this structure results in no increase in the magnetic resistance of the joint, permitting magnetic flux to smoothly pass from the second thin film 12 to the second abutting segment 2.

Figure 23:
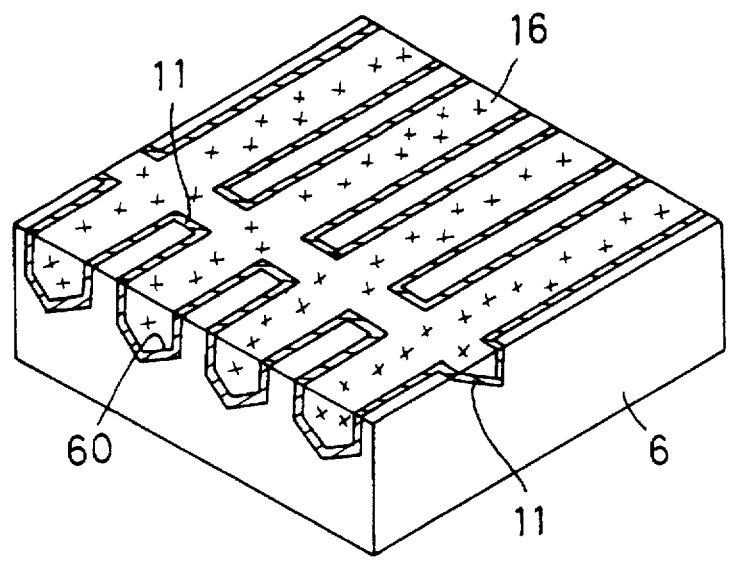
FIG. 23 is a perspective view of a large substrate formed with first preliminary grooves which have a V-shaped bottom and are filled with a first glass.
Figure 24:
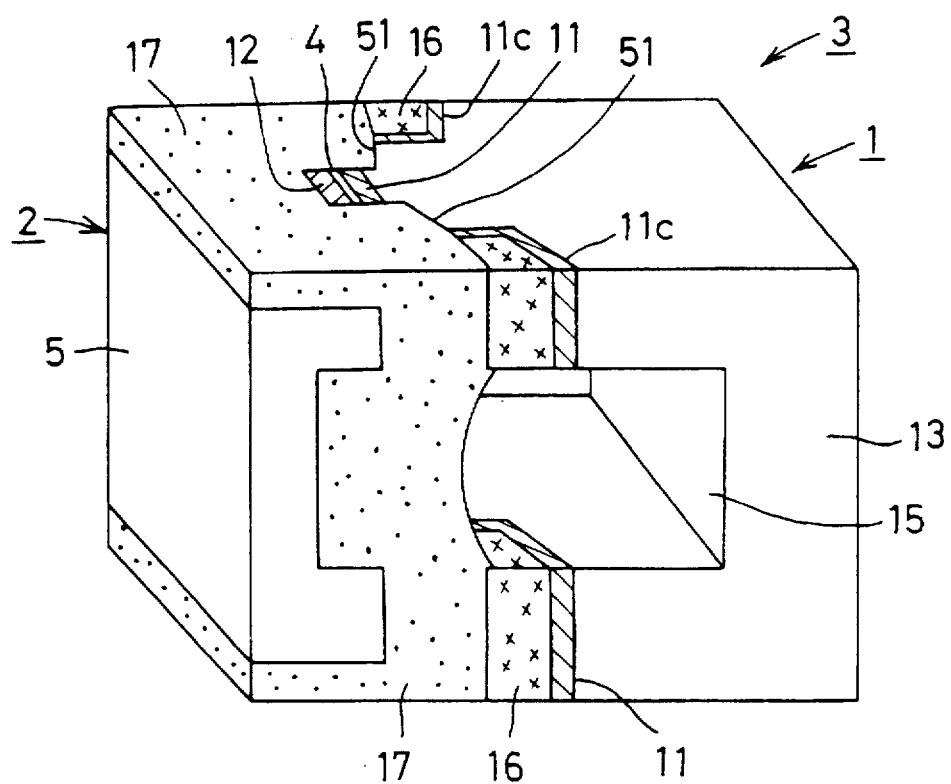
FIG. 24 is a perspective view of a magnetic head fabricated with use of the large substrate of FIG. 23.

When the first preliminary groove 60 to be formed in the large substrate 6 is V-shaped at its bottom as seen in FIG. 23, the first ferromagnetic thin film 11 formed on the large substrate 6 is so exposed as indicated in dotted lines in FIG. 21 at a position where it is opposed to the small substrate 8, with the result that as shown in FIG. 24, the thin film 11 has portions 11c exposed on the upper surface of the head 3 and inclined with respect to the direction of the gap width. This eliminates crosstalk from adjacent tracks when signals are reproduced from the hard disk by the magnetic head 3 as mounted on the slider body 90.

Figure 25:
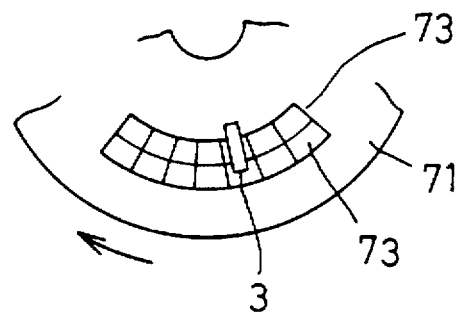
FIG. 25 is a plan view showing tracks on a hard disk.

Stated more specifically with reference to FIG. 25, tracks 73 concentric with the hard disk 71 are closely formed on the disk, while the overall width of the head 3 is greater than the track width. Accordingly it is likely that a crosstalk component of signal from an adjacent track will be reproduced. However, when the first thin film 11c exposed on the upper surface of the side portion of the head 3 is inclined with respect to the direction of the track width, the inclination obviates the likelihood of reproducing a crosstalk component from a track 73 adjacent to the thin film 11c.

Figure 26:
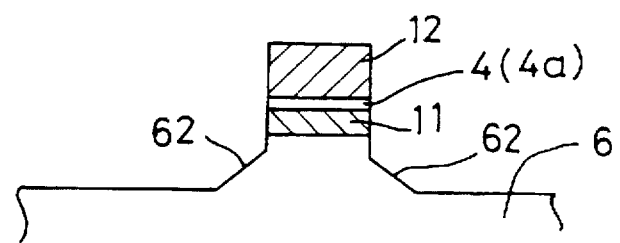
FIG. 26 is an enlarged fragmentary view of a large substrate formed with minute slopes.

When the etching step illustrated in FIG. 6 shapes the upper gap spacer 4 and the second thin film 12 in the form of a small-width portion and large-width portion in combination and gives the first thin film 11 the same width as the small-width portion, the etching treatment is likely to form minute slopes 62 extending from the upper surface of the large substrate 6 to the gap spacer 4 as shown in FIG. 26 by virtue of a so-called shadow effect. The minute slopes 62 appear as inclined lines 51 as shown in FIG. 24 in the magnetic head 3 completed. The inclined lines 51 formed are also effective for eliminating the crosstalk from adjacent tracks.

FOURTH EMBODIMENT

Figure 27:
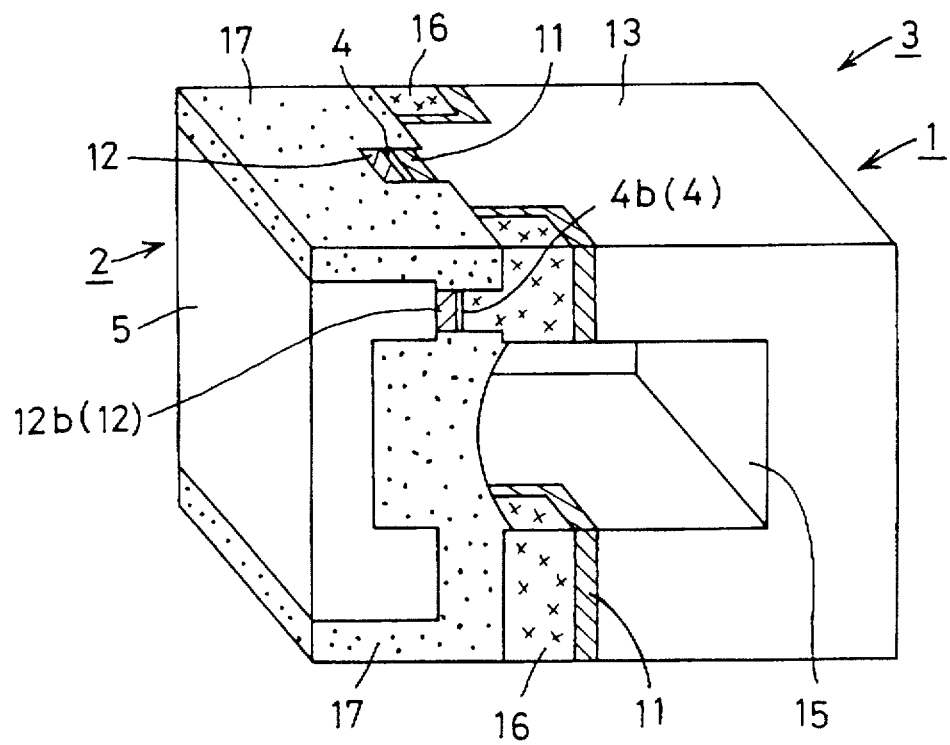
FIG. 27 is a perspective view of a magnetic head of fourth embodiment.

FIG. 27 shows a modification of the magnetic head 3 shown in FIG. 17. Like the second embodiment, this head differs from the head 3 shown in FIG. 17 in that the large-width protions 12b, 4b of the second ferromagnetic thin film 12 and the gap spacer 4 are exposed on the lateral sides of the head 3.

As is the case with the second embodiment, this makes it possible to readily recognize the gap depth during the fabrication of the magnetic head 3.

The production process of the magnetic head 3 is nearly the same as that of the head 3 according to the third embodiment except that as shown in FIG. 14, the etching step forms a connecting bar 41 for interconnecting the large-width portions 4b, 12b of the upper gap spacer 4 and the second thin film 12 on the large substrate 6. A winding groove 15 is formed in this state, the small substrate 8 is abutted against the large substrate 6 and joined thereto with glass, and the resulting assembly is sliced, whereby the magnetic head 3 shown in FIG. 27 is obtained.

In the magnetic head 3 shown in FIG. 24 wherein the first thin film 11c exposed on the upper surface side portion of the head 3 is inclined with respect to the track width direction, the large-width portions 12b, 4b of the second thin film 12 and the upper gap spacer 4 may be exposed on the lateral side of the head 3.

FIFTH EMBODIMENT

Figure 28:
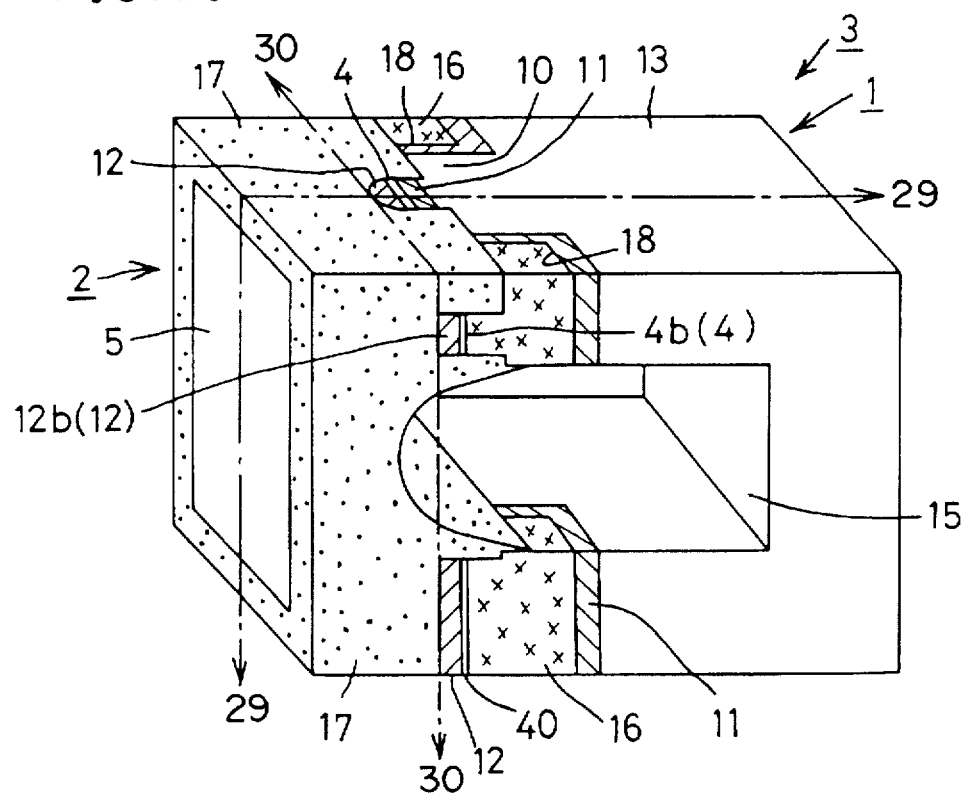
FIG. 28 is a perspective view of a magnetic head of fifth embodiment.
Figure 29:
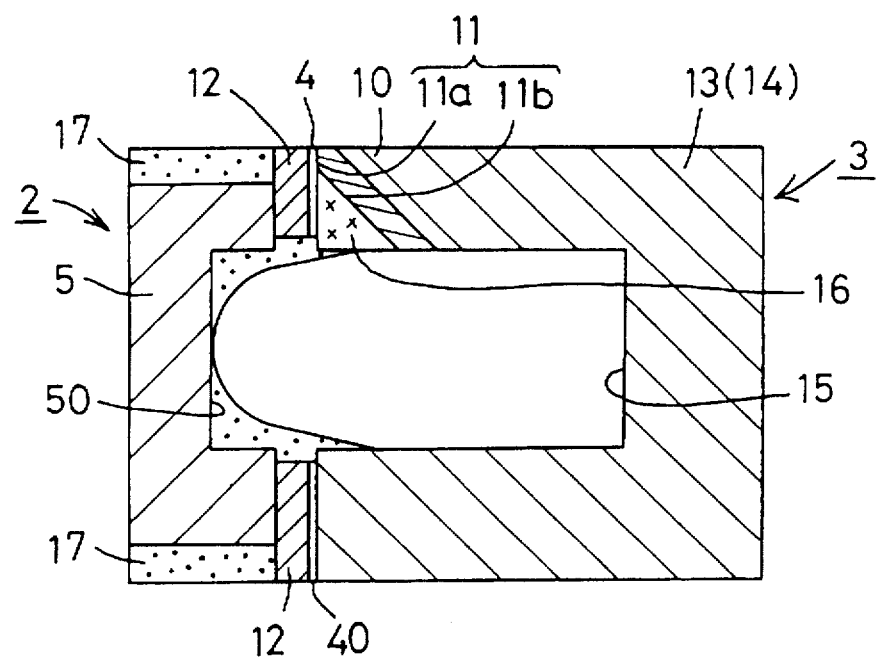
FIG. 29 is a view showing the magnetic head of FIG. 28 in section taken along the line J—J in FIG. 28.
Figure 30A:
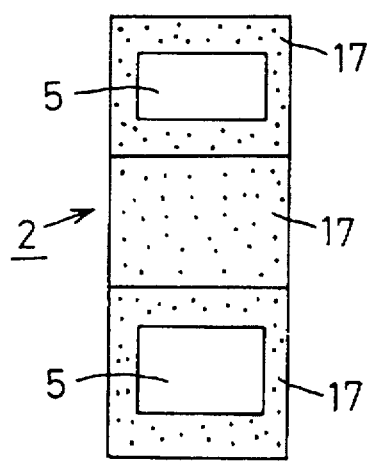
FIG. 30A is a left side view in section taken along the line I—I in FIG. 28 and showing the magnetic head.
Figure 30B:
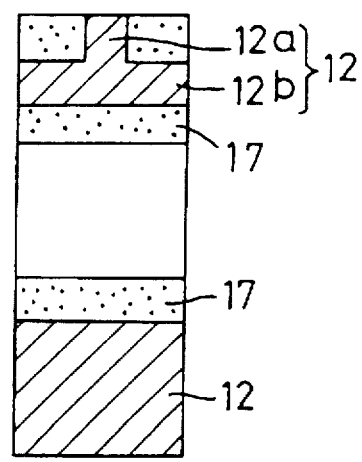
FIG. 30B is a right side view of the same.

FIG. 28 is a perspective view of another magnetic head 3, FIG. 29 is a view in section taken along the line J—J in FIG. 28, and FIGS. 30A and 30B are respectively a left side elevation and a right side elevation showing the head 3 in section along the line I—I in FIG. 28 as viewed across the section. Like the fourth embodiment, the magnetic head 3 comprises a first abutting segment 1 having an upper gap spacer 4 and a second ferromagnetic thin film 12 exposed on its lateral sides, and a second abutting segment 2 abutting against and joined to the segment 1 and having a face to be opposed to a hard disk and covered with a nonmagnetic second glass 17. The second segment 2 comprises a substrate 5 made of a magnetic material and covered with the second glass 17 over the upper and lower faces and opposite lateral faces thereof. The glass covering gives the segment 2 improved mechanical strength.

With reference to FIG. 29, the second abutting segment 2 is formed with a fitting groove 50 opposed to a winding groove 15 and filled with the second glass 17 for joining the two segments 1, 2. The amount of the second glass for joining the two segments 1, 2 is lesser than in the magnetic head of third embodiment (see FIG. 18) because of a reason involved in the fabrication of the head, and this is not a technical feature.

With reference to FIG. 28, the second ferromagnetic thin film 12 exposed on the surface of the head to be opposed to the hard disk has an upper face curved in the form of a circular arc toward the second abutting segment 2. This is one of the features of the present embodiment as will be described later.

The magnetic head 3 is fabricated by the following process.

First as seen in FIG. 5, a large substrate 6 is prepared which has a first ferromagnetic thin film 11 exposed in section in the same plane as a first glass 16. Up to this step, the process is the same as that for the first embodiment.

Figure 31:
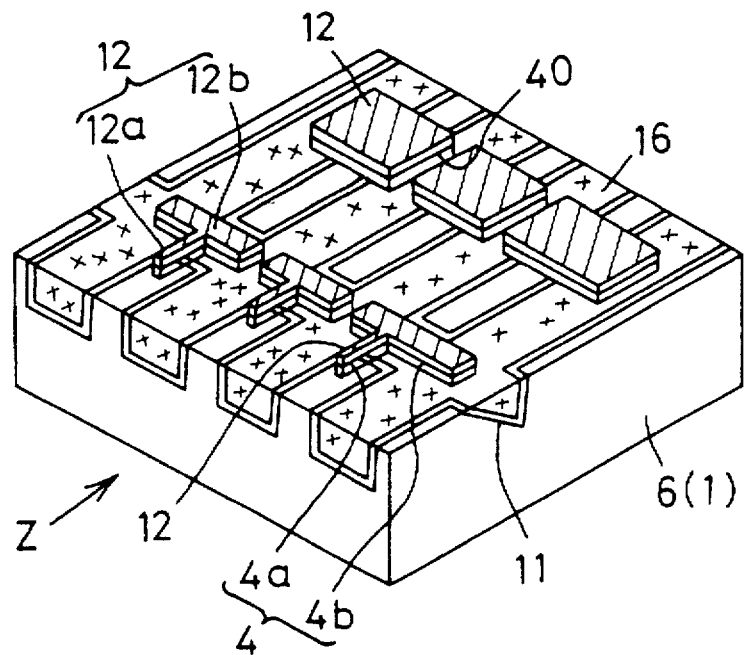
FIG. 31 is a perspective view of an etched large substrate for use in the magnetic head of the fifth embodiment.

Next, a nonmagnetic thin film for providing the gap spacers 4, 40 and a second ferromagnetic thin film 12 superposed thereon are formed on the upper surface of the large substrate 6 as by sputtering, followed by the formation of a resist pattern and etching, whereby portions for providing gap portions including upper gap spacers 4 and lower gap spacers 40 are allowed to remain on the substrate as seen in FIG. 31. The second thin film 12 is shaped in the same form as the gap spacers 4, 40. The large-width portions 12b, 4b of the second thin film 12 and the upper gap spacers 4 and the lower gap spacers 40 extend laterally, such that the large-width portions 4b, 12b and the lower gap spacer 40 are exposed on the lateral sides of each magnetic head 3 obtained.

Figure 32:
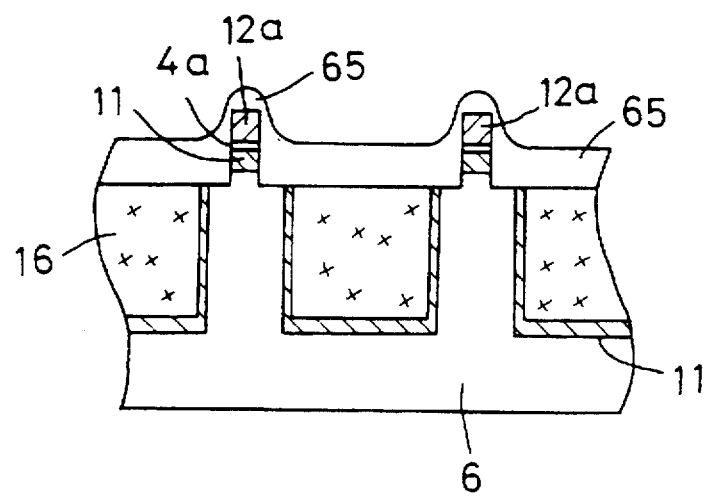
FIG. 32 is a view of the large substrate of FIG. 31 as coated with a photoresist and as viewed in the direction of arrow Z.
Figure 33:
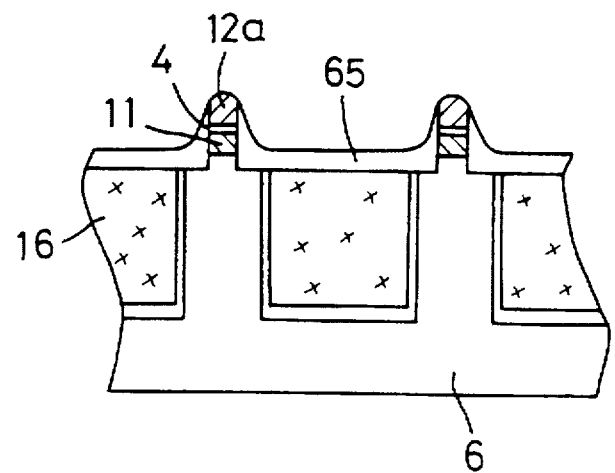
FIG. 33 is a view showing the large substrate as irradiated with an ion beam.

The entire upper surface of the large substrate 6 is then coated with a photoresist 65 comprising a photosensitive material and thereafter irradiated with an ion beam. FIG. 32 is a sectional view showing the large substrate of FIG. 31 as it is viewed in the direction of arrow Z in FIG. 31 after the irradiation with the ion beam. Since the small-width portion 12a of the second thin film 12 projects from the upper surface of the large substrate 6, the photoresist 65 covering the small-width portion 12a is thinner than the photoresist 65 covering the other portion. Accordingly, when the photoresist coating is continuously irradiated with the ion beam, the photoresist 65 over the top of the small-width portion 12a disappears although the photoresist 65 covering the other portion remains, and the irradiation starts to remove the second thin film 12. The irradiation is thereafter discontinued, and the photoresist coating 65 is removed, whereby the upper surface of the small-width portion 12a of the second thin film 12 is shaped in the form of an upwardly bulging circular arc as shown in FIG. 33.

As is the case with the foregoing embodiments, a winding groove 15 is subsequently formed in the large substrate 6 between the gap spacers 4, 40 (see FIG. 37).

Figure 34:
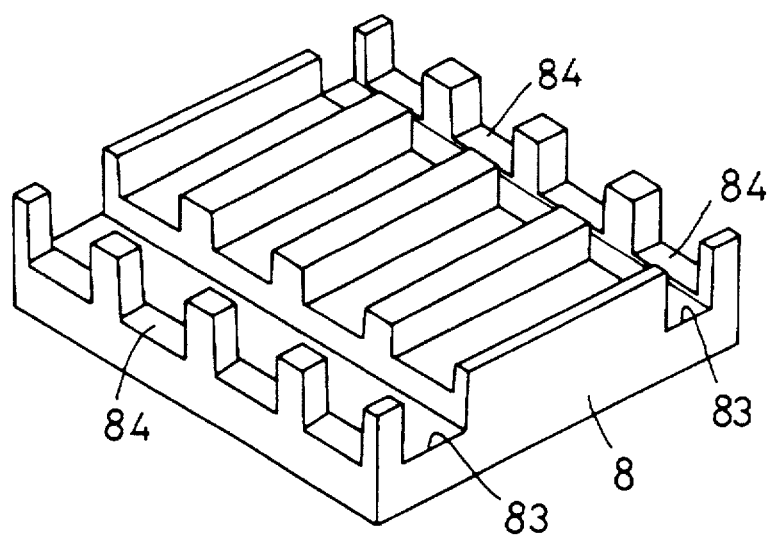
FIG. 34 is a perspective view of a small substrate for use in the fifth embodiment.
Figure 35:
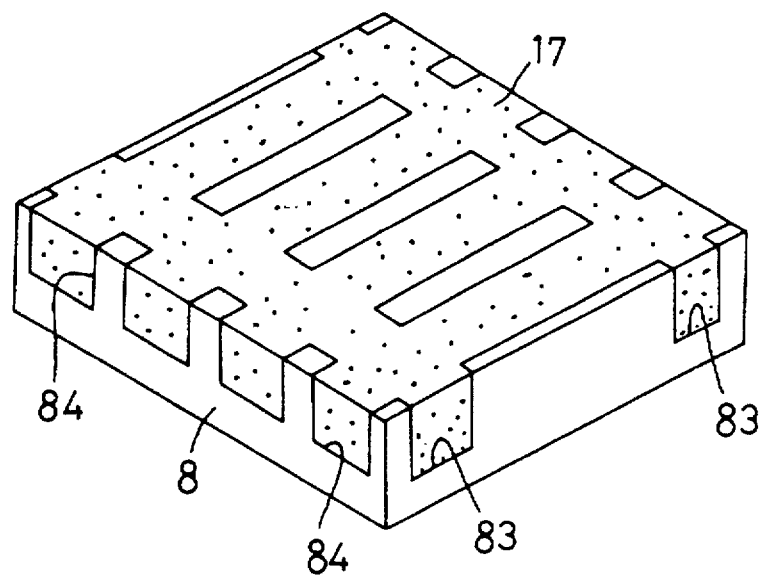
FIG. 35 is a perspective view showing the small substrate of FIG. 34 as filled with a second glass.
Figure 36:
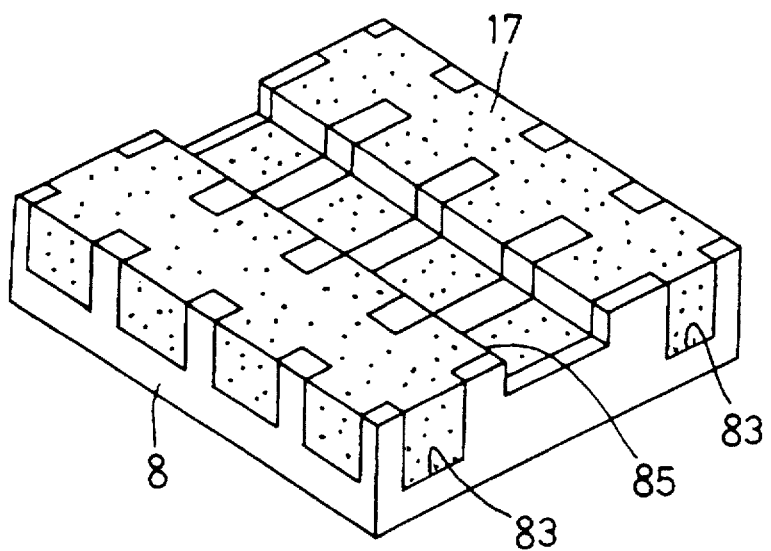
FIG. 36 is a perspective view showing the small substrate of FIG. 35 as formed with an adjusting groove.

On the other hand, abutting grooves 83, 83 and grooves 84 orthogonal to the abutting grooves 83, 83 are formed in a ferromagnetic small substrate 8 made of Mn-Zn ferrite or the like as seen in FIG. 34. The abutting grooves 83, 83 are to be opposed respectively to the upper gap spacer 4 and the lower gap spacer 40 of the first abutting segment 1. As seen in FIG. 35, the abutting grooves 83, 83 and the grooves 84 are then filled with a second glass 17, and the substrate upper surface is thereafter ground and polished to a planar form. Next as shown in FIG. 36, an adjusting groove 85 to be opposed to the winding groove 15 in the large substrate 6 is formed. The adjusting groove 85 is formed to adjust the amount of the second glass 17 for joining the two abutting segments 1, 2 and also to give a decreased inductance value to the magnetic head 3 to be obtained.

Figure 37:
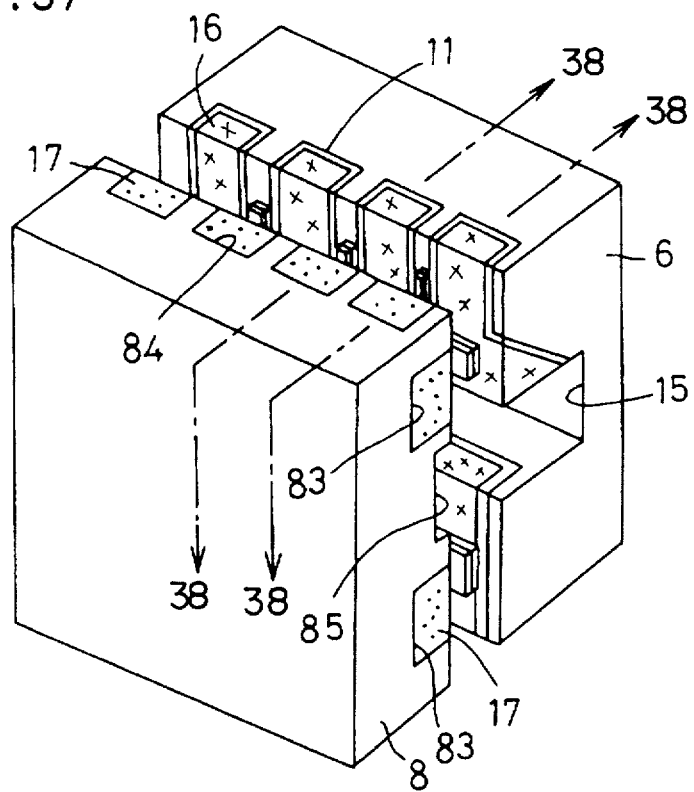
FIG. 37 is a perspective view showing the large substrate and the small substrate as abutted thereagainst.
Figure 38:
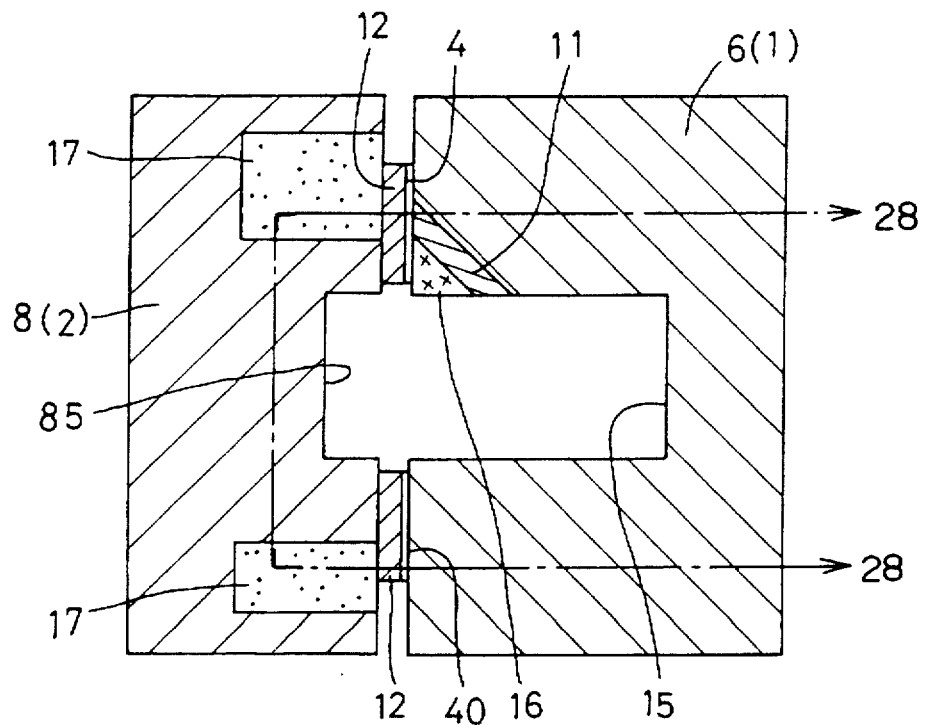
FIG. 38 is a central sectional view of a block obtained by cutting the assembly of the large and small substrates of FIG. 37 along the lines P—P in FIG. 37.

With reference to FIG. 37, the two substrates 6, 8 as abutted against each other are subsequently heated to melt the second glass 17. The second glass 17 flows out of the abutting grooves 83 and the groove 84, bonding the two substrates 6, 8. At this time, the small substrate 8 is positioned down as in the case of the third embodiment, allowing the second glass 17 to flow in sideways of the gap portion. Finally, the assembly of the joined substrates 6, 8 are sliced into blocks along lines P—P, and each block is cut along the line C—C and line D—D shown in FIG. 38 to obtain the magnetic head 3 shown in FIG. 28.

The $SiO_2$ film and the glass film described with reference to the first embodiment may be formed before joining on at least one of the abutting faces of the second ferromagnetic thin film 12 and the second abutting segment 2 to give an improved joint strength.

Like the magnetic heads 3 of the foregoing embodiments, the magnetic head 3 produced by the above process has the advantage of being diminished in inductance value and also the advantage of reducing the distortion of reproduction output waveform owing to a so-called contour effect, by the circular-arc curved front face of the second thin film 12.

Figure 39:
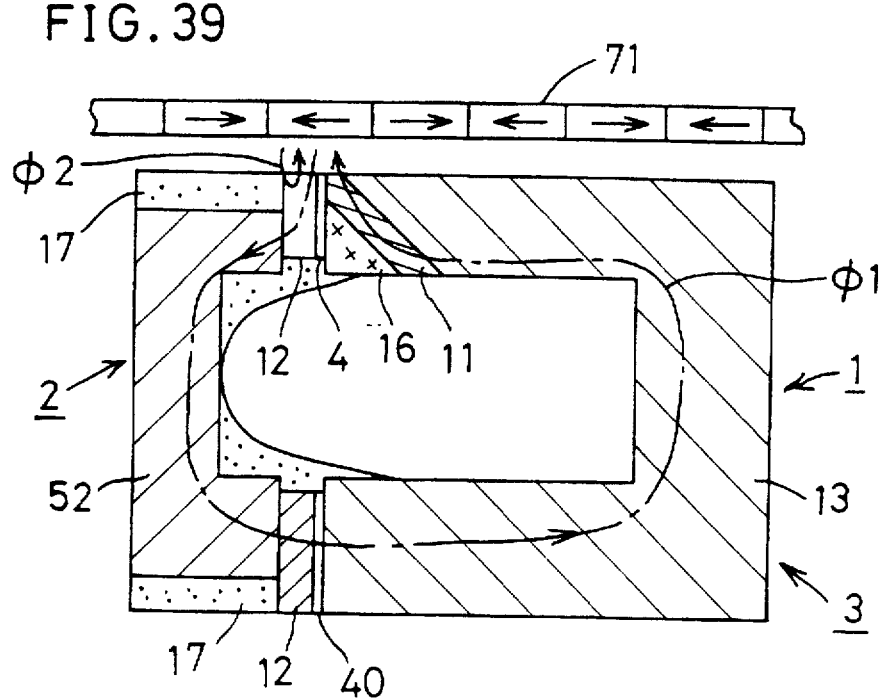
FIG. 39 is a diagram showing main flux $\phi 1$ and stray flux $\phi 2$ during the playback of a hard disk.

The contour effect will now be described. FIG. 39 is a diagram showing the relationship between a magnetic pole on the hard disk 71 and the magnetic head 3. When the magnetic pole is opposed to the upper gap spacer 4 during the rotation of the hard disk, stray flux $ø2$ usually occurs at the boundary between the second ferromagnetic thin film 12 and the second glass 17 in addition to the main flux $ø1$ revolving through the head 3. The superposition of such fluxes results in the distortion of the reproduction output waveform. This phenomenon is termed a contour effect.

The effective magnitude of the stray flux $ø2$ is in proportion to the length over which the boundary is opposed to the magnetic pole of the hard disk. In other words, the stray flux $ø2$ increases if the boundary extends straight along the direction of the track width.

Accordingly, if the boundary between the second thin film 12 and the second glass 17 is curved with respect to the direction of the track width, the boundary includes a portion opposed to a magnetic pole on the hard disk and a portion not opposed to the same pole, with the result that the effective magnitude of the stray flux $ø2$ is smaller than when the boundary between the thin film 12 and the glass 17 extends along the track width. With the magnetic head 3 of the present embodiment, therefore, the distortion of the reproduction output waveform due to the contour effect diminishes.

Figure 40:
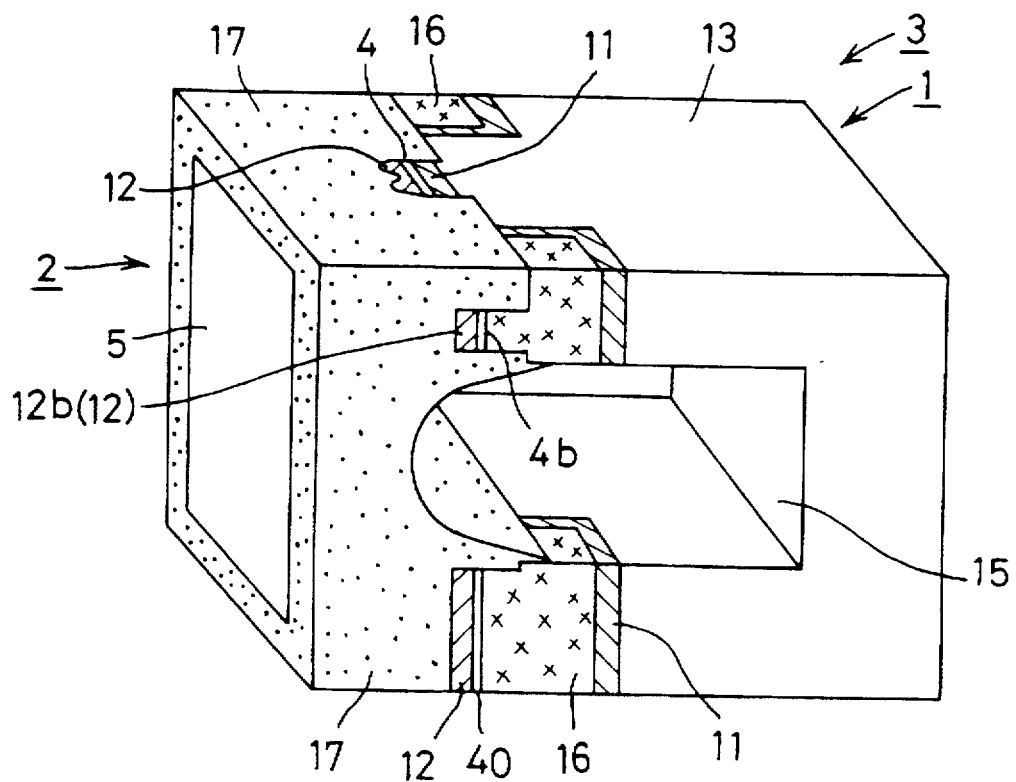
FIG. 40 is a perspective view of a magnetic head as an application example of the fifth embodiment.
Figure 41:
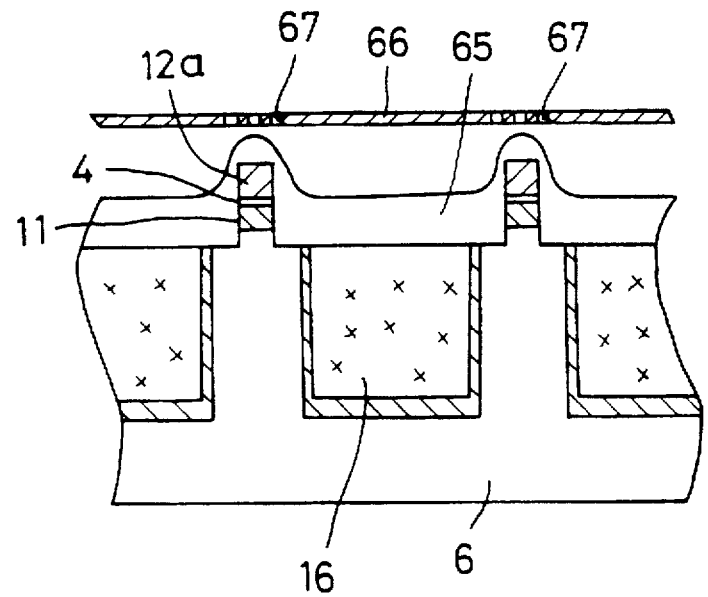
FIG. 41 is a view illustrating an exposure step using a photomask as disposed above the photoresist coating.
Figure 42:
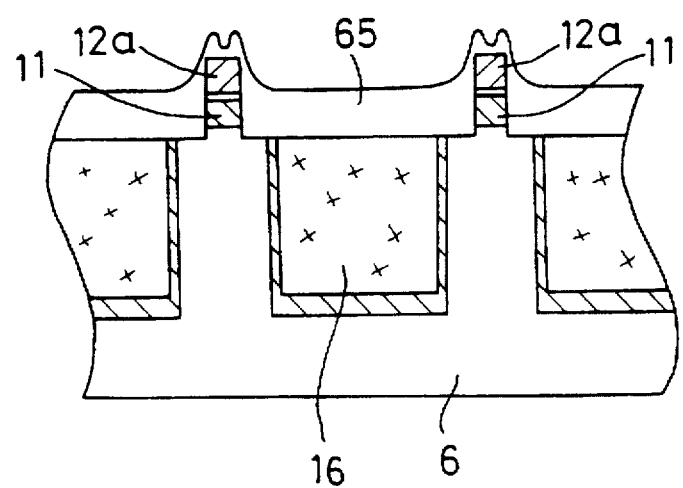
FIG. 42 is a view showing the photoresist coating having a wavelike curved upper surface.

FIG. 40 is a perspective view showing another magnetic head 3 which is adapted to reduce the reproduction output waveform distortion due to the contour effect. The second ferromagnetic thin film 12 opposed to the second glass 17 has a wavelike curved front face. To fabricate this magnetic head 3, the photoresist removal step following the foregoing etching step includes an exposure step which is performed with a photomask 66 disposed above the aforementioned photoresist 65 as shown in FIG. 41, the photomask 66 having a plurality of slits 67 extending orthogonally to the track width direction. The photoresist 65 covering the small-width portion 12a of the second thin film 12 is made to curve to a wavy form by an exposure as seen in FIG. 42. When the photoresist coating is irradiated with an ion beam in this state, the upper surface of the small-width portion 12a is shaped to a wavelike curved form, and the magnetic head 3 shown in FIG. 40 is eventually obtained.

The upper surface of the small-width portion 12a may be curved to the wavelike form by effecting sandblasting after the etching step, with the area other than the second thin film 12 covered with a photoresist.

The magnetic head 3 shown in FIG. 28 may be so modified that the first ferromagnetic thin film 11 exposed at the upper surface side portions of the head 3 is inclined with respect to the track width direction as shown in FIG. 24.

Further the magnetic head 3 shown in FIG. 1 can be adapted to reduce the distortion of the reproduction output waveform due to the contour effect by shaping the front face of the second ferromagnetic thin film 12 to a circular-arc form.

The magnetic heads 3 according to the foregoing embodiments have in common the advantage of being decreased in inductance value and improved in magnetic characteristics since the area of the magnetic material to be opposed to the hard disk serving as a recording medium is smaller than in the conventional head, and also the advantage of being improved in the accuracy of the gap length t since the upper gap spacer 4 and the second ferromagnetic thin film 12 formed are shaped by etching along with the first ferromagnetic thin film 11.

The present invention is not limited to the foregoing embodiments in construction but can be modified variously within the scope defined in the appended claims.

What is claimed is:

1. A magnetic head for recording and reproduction from a recording medium, said magnetic head comprising:

a first abutting segment having an open side defining a winding groove, said first abutting segment comprising a first core segment member of a ferromagnetic material, a first ferromagnetic thin film disposed on said first core segment member, and a first glass in contact with said first magnetic thin film, said first core segment member and said first ferromagnetic thin film forming a first core segment, and a second ferromagnetic thin film forming a first portion of a second core segment, with a gap spacer interposed between the first ferromagnetic thin film and the second ferromagnetic thin film, said gap spacer being disposed on the first ferromagnetic thin film and on the first glass; said magnetic head further comprising a second abutting segment abutting the open side of the winding groove in the first abutting segment, said second abutting segment being joined to the first abutting segment, said second abutting segment comprising a magnetic material portion for passing circulating magnetic flux thereto, said magnetic material portion being joined to the second ferromagnetic thin film and forming a second portion of the second core segment, said second abutting segment further comprising an opposing face formed by a second glass having a lower melting point than the first glass, said magnetic material portion being attached to the second glass without adhesive agent, said opposing face being configured to oppose a recording medium, wherein said first ferromagnetic thin film, the gap spacer, and the second ferromagnetic thin film are configured to be exposed on a surface of the first abutting segment which is exposed to the recording medium, and wherein said second glass is laterally opposed to a portion of the first ferromagnetic thin film, the gap spacer, and the second ferromagnetic thin film, to bond the second abutting segment to the first abutting segment, said second ferromagnetic thin film and the gap spacer being divided by the winding groove into the first portion positioned toward the opposing face and a second portion positioned below the winding groove.

2. A magnetic head as recited in claim 1, wherein the second ferromagnetic thin film comprises a small width section having an exposed outer end, said exposed outer end being configured to oppose the recording medium, and a large width section integrally formed with an inner end of the small-width section and joined to the second abutting segment.

3. A magnetic head as recited in claim 2, wherein a portion of said first ferromagnetic thin film which is in contact with the gap spacer has a width which is the same as the small-width section of the second ferromagnetic thin film.

4. A magnetic head as recited in claim 2, wherein the large-width section of the second ferromagnetic thin film is exposed on a surface of the first abutting segment.

5. A magnetic head as recited in claim 2, wherein the small-width section of the second ferromagnetic thin film includes a curved surface, said curved surface being disposed on the second core segment at a position which is opposed to and which joins the second abutting segment.

6. A magnetic head as recited in claim 1, wherein said second glass has an exposed boundary therebetween, said exposed boundary being configured to be opposed to the recording medium and with a portion of the exposed boundary inclined with respect to a direction of track width of the recording medium.

* * * * *